US009528902B2

(12) United States Patent
Clew et al.

(10) Patent No.: US 9,528,902 B2
(45) Date of Patent: *Dec. 27, 2016

(54) DIE CONDITION DETECTION

(71) Applicant: Henrob Limited, Flintshire (GB)

(72) Inventors: Nicholas Richard Clew, Farmington Hills, MI (US); Peter John Elliot, Novi, MI (US); Stephen Henry Kaminski, Roseville, MI (US)

(73) Assignee: Henrob Limited, Flintshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/680,644

(22) Filed: Apr. 7, 2015

(65) Prior Publication Data

US 2015/0219521 A1    Aug. 6, 2015

Related U.S. Application Data

(63) Continuation-in-part of application No. 14/175,664, filed on Feb. 7, 14, now abandoned, which is a
(Continued)

(51) Int. Cl.
*B21J 15/02* (2006.01)
*B21J 15/36* (2006.01)
(Continued)

(52) U.S. Cl.
CPC ............ *G01M 3/223* (2013.01); *B21D 39/031* (2013.01); *B21J 15/025* (2013.01); *B21J 15/28* (2013.01);
(Continued)

(58) Field of Classification Search
CPC ........ B21D 39/031; B21J 15/025; B21J 15/18; B21J 15/28; B21J 15/36
See application file for complete search history.

(56) References Cited

U.S. PATENT DOCUMENTS

| 4,806,913 A | 2/1989 | Schmidt |
| 5,778,516 A | 7/1998 | Dear et al. |

(Continued)

FOREIGN PATENT DOCUMENTS

| DE | 102004002593 | 7/2004 |
| DE | 102005045376 | 2/2007 |

(Continued)

OTHER PUBLICATIONS

Office Action from the European Patent Office for Application 09720329.3 dated Jun. 11, 2013 (4 pages).
(Continued)

*Primary Examiner* — Teresa M Ekiert
(74) *Attorney, Agent, or Firm* — Michael Best & Friedrich LLP

(57) ABSTRACT

A die is supported in a die holder such as a frame or an adapter supported in a frame such that it is operational use in a material deforming operation. One or both of the die and the die holder have at least one gas passage which is substantially closed by at least part of the die. Gas such as pressurized air is directed into an end of the gas passage opposite the die via a hose connected to a gas source. If the die is broken or loose leak paths are available for the escape of gas past the die to or from atmosphere. A pressure sensor connected to the hose detects the change in pressure of the gas and the magnitude of that pressure is used to determine the die condition. Alternatively a flow rate sensor is used to detect a change in the flow rate of the gas in order to determine the condition of the die.

24 Claims, 14 Drawing Sheets

Related U.S. Application Data continuation of application No. 12/921,503, filed as application No. PCT/GB2009/000572 on Mar. 3, 2009, now Pat. No. 8,671,726.

(60) Provisional application No. 61/035,208, filed on Mar. 10, 2008, provisional application No. 61/114,254, filed on Nov. 13, 2008.

(51) Int. Cl.
<br>　　*B21D 39/03*　　(2006.01)
<br>　　*G01M 3/22*　　(2006.01)
<br>　　*B23K 15/00*　　(2006.01)
<br>　　*B22F 3/105*　　(2006.01)
<br>　　*B22F 3/02*　　(2006.01)
<br>　　*B21J 15/28*　　(2006.01)
<br>　　*B33Y 10/00*　　(2015.01)
<br>　　*B33Y 80/00*　　(2015.01)
<br>　　*B22F 5/00*　　(2006.01)

(52) U.S. Cl.
<br>　　CPC ............ *B21J 15/36* (2013.01); *B22F 3/02* (2013.01); *B22F 3/1055* (2013.01); *B23K 15/0086* (2013.01); *B22F 2005/002* (2013.01); *B33Y 10/00* (2014.12); *B33Y 80/00* (2014.12)

(56) References Cited

U.S. PATENT DOCUMENTS 6,058,598 A　　5/2000　Dixon et al.
<br>2007/0162250 A1　7/2007　Holden et al.

FOREIGN PATENT DOCUMENTS

DE　　202007011668　　1/2008
<br>EP　　　　1481745　　1/2004
<br>JP　　　　54154880　　12/1979
<br>WO　　　2008003311　　1/2008

OTHER PUBLICATIONS

International Search Report in PCT/GB2009/000572, dated Oct. 9, 2009 (6 pages).

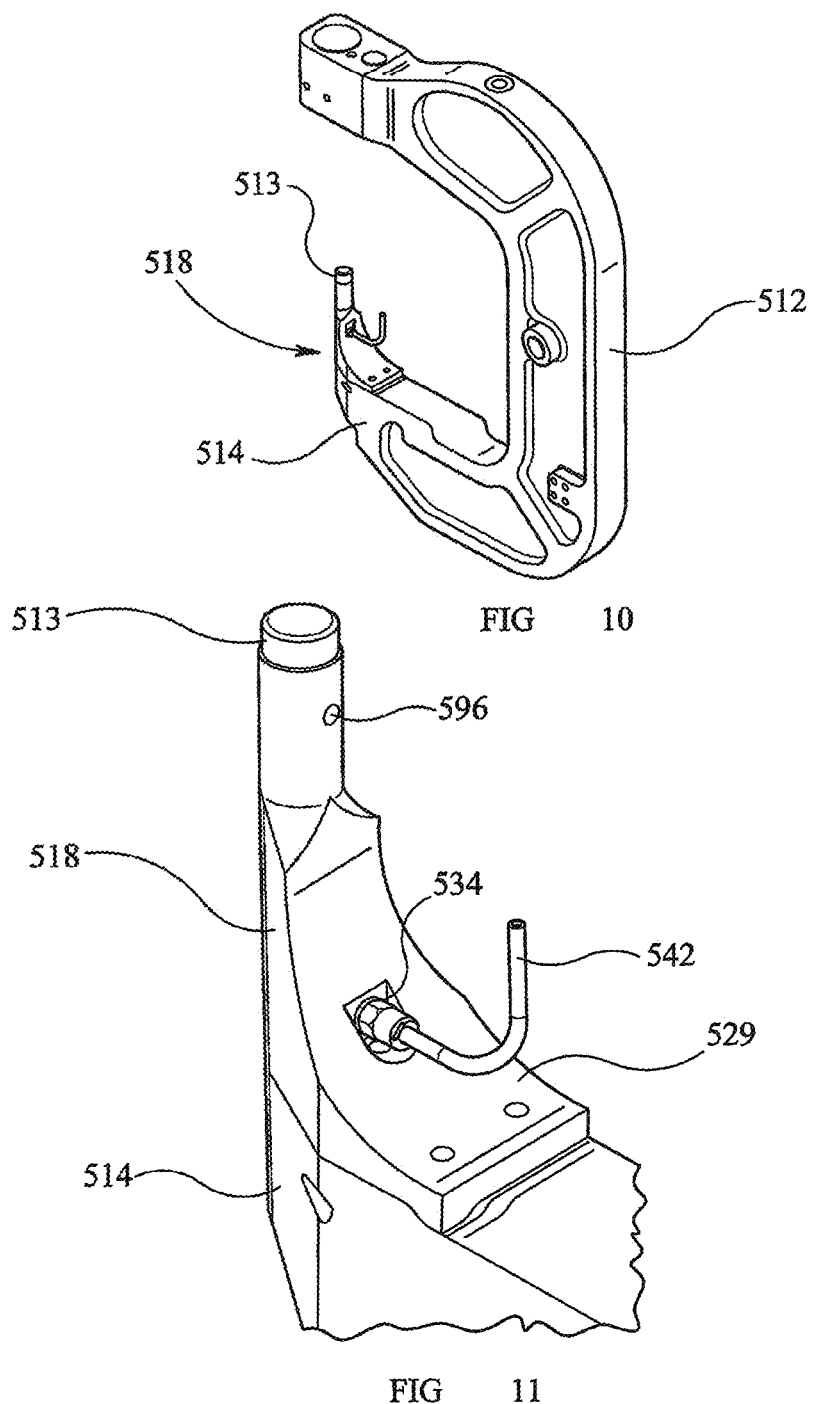

DIE CONDITION DETECTION

FIELD

The present invention relates to a die assembly configured to enable detection of the condition of the die. More particularly, but not exclusively, the invention relates to detecting the condition of a die used in a riveting application. The term "condition of the die" is intended to include, amongst other things, damage of the die, wear of the die, a loosely fitted die and the complete absence of a die from a die assembly.

SUMMARY

In self-piercing riveting a partially hollow rivet of a particular configuration is inserted into a workpiece such as, for example, one of more sheets of material without full penetration such that a deformed end of the rivet remains encapsulated by an upset annulus of the material. The rivet typically comprises a head and a partially hollow cylindrical shank that terminates in an annular piercing edge.

Self-piercing rivet insertion is generally performed by a hydraulically, pneumatically or electrically operated rivet setting tool that is supported by one arm of a C-frame over a suitably shaped die that is supported by the other arm. The die typically comprises a head defining a die cavity and a depending stem that is received in a bore in the arm of the C-frame. As the rivet is driven into the sheets of material by a punch of the setting tool, the shank pierces the top sheet and pushes workpiece material into the cavity. The shank then flares outwardly in the die, with this workpiece material forming an annulus in the die cavity that encapsulates the shank. The shank of the rivet remains embedded in the sheet material after the rivet has been set thereby forming a "button" on one side of the join. Self-piercing riveting enables sheet material to be joined without the requirement for the pre-drilling or pre-punching of a hole in the material.

The insertion force required to pierce the material in question has to be reacted wholly or at least in part, by the die. In many applications the magnitude of this force will be high and the die is therefore subject to very high loading and wear. On this basis the die needs periodic inspection and replacement. In practice, dies sometimes crack and/or break into pieces. For example, all or part of the head of the die may break away from the stem, or a part of the head may break away with a part of the stem that is directly under it. The life expectancy of a die is dependent on many factors including, for example, the number of riveting cycles to which it is subjected, the rivet setting forces, the material being riveted, the alignment of the die to the workpiece and the actuator punch, the amount of joint expansion into the die cavity (i.e. the extent of flow of workpiece material within the cavity), the material properties of the die, the quality of the surface on which the die is supported in the C-frame, the degree of retention of the die in the C-frame and instances of erroneous operation in which the setting tool impacts directly on the die (this can occur inadvertently, for example, when the sheet material and/or rivet are not present above the die either as a result of error or during a test operation).

In an automated riveting system either the C-frame is moved by a robotic arm or the workpiece is moved to the setting tool in a production line environment and a certain amount of quality control is performed by automatic monitoring of the riveting operation. Automated process monitoring systems incorporating transducers of various kinds are currently used in conjunction with riveting systems to monitor various aspects of the riveting operation including, in particular, the position of the rivet, the distanced traveled by the setting tool punch both prior to and during rivet insertion, and the insertion force applied during rivet setting. Such monitoring systems can be configured to deduce that a die is missing by for example detecting when the punch has traveled a distance above a predetermined threshold (i.e. it has traveled to a point beyond where the die would ordinarily be present) before it meets with resistance. However, in instances where a small part of the die breaks away the fault is not always detectable by the process monitoring transducers as the damage to the die often does not significantly affect the distance traveled by the punch or on the force profile applied by the punch. The faulty die can cause unsightly distortion of the sheet material around the rivet insertion location and the strength of the joint may be compromised as a consequence. Moreover, a die that is worn or is loose in the C-frame cannot be detected with the currently available process monitoring systems. It will be appreciated that in such circumstances a batch of faulty joints can be generated before they are inspected and intercepted. This not only delays the production process but wastes materials and so there can be a significant cost to the manufacturer.

It is known to use air pressure to check for faults in a die. A sensing head comprising, for example, a disc of nylon with an open chamber therein is presented over the die cavity such that it is sealed against it. Pressurised air is supplied into the sensing head and the pressure of the air in the chamber is detected by a pressure sensor. If the die is broken air is able to escape between the seal in the head and the broken face of the die resulting in a relatively low reading on the pressure sensor. Similarly, if a die is missing this will be detected by a low reading on the pressure sensor. A checking system of this kind works well for dies that are broken or missing but requires accurate robotic positioning equipment to move the sensing head or the C-frame to a position where the sensor head is presented and sealed to the die or at least presented to the die space. Not only does this require an expensive investment in machinery but it also introduces delays into the rivet cycle time. The manufacturer has to balance the quality control benefits provided by performing the checking process at regular intervals against the time it takes. If the checking process reveals a broken or missing die then all the joints performed since the preceding check are potentially faulty and they either have to be checked or scrapped. It is therefore in the interest of the manufacturer to perform the checking process at regular short intervals.

It is not possible for an air pressure checking system of the kind described above to detect a die that is in loose engagement with the C-frame. If a die is loose the mating surfaces of the underside of the die head and the surface of the arm of the C-frame against which it bears can become worn or damaged. This reduces the life expectancy of the die and generally leads to premature die failure. Moreover, if a loose die is used for an extended period it can often fall out of the C-frame and unless its absence is detected immediately the next joint that is made without the die will generally be so poor that the workpiece may have to be scrapped.

If a die is worn, its shape can become altered to the point that the flow of workpiece material in the cavity is disrupted. This can lead to the rivet shank not flaring sufficiently, or to the rivet shank fully penetrating the workpiece (and thereby producing a joint of reduced aesthetics and resistance to corrosion)

It is one object of the present invention, amongst others, to obviate or mitigate at least one of the aforementioned disadvantages and to provide for an improved or alternative die assembly that enables its condition to be detected.

According to a first aspect of the present invention there is provided a die assembly comprising a die having a first surface defining a die cavity in which material is to be deformed, a die holder in which the die is supported such that the die is operational with the die cavity being exposed for receipt of material, at least one gas passage is defined at least partially by the die holder, the at least one gas passage extending to a first end located between the die and the die holder, the first end being sealed substantially closed by at least a portion of the die, a conduit having an outlet in fluid communication with the at least one gas passage and an inlet connectable to a source of pressurised gas, and a sensor for detecting the pressure or flow rate of the gas in the at least one gas passage.

A die assembly according to the first aspect of the invention may be advantageous in allowing the condition of a die to be detected by applying a gas at a pressure and flow rate to the at least one gas passage and detecting a change in at least one of the pressure or flow rate. This may allow determination of whether, for example, the die has fractured, is absent completely, is not located properly or held sufficiently tightly, or has undergone significant wear.

The die may be a multi-part assembly comprising a radially outer ring, positioned circumferentially around a radially inner hub within which at least part of the cavity is defined.

The ring may or may not be substantially annular in shape. For example, the inner and/or outer circumference of ring may be circular, hexagonal, octagonal or oval in axial cross-section. The hub may also take any suitable shape. The hub and ring may be in direct contact, or may be spaced apart by a gap or by one or more other components such as gaskets.

The ring may be configured to provide reinforcement against radial expansion of the die.

This may be advantageous in improving the resistance of the die to bursting due to the pressure of workpiece material forced into the cavity.

A ring may be considered to provide reinforcement against radial expansion of the die if it increases the hoop strength of the hub portion by at least 10%. For instance, the ring may increase the hoop strength of the hub portion by at least 15% or at least 20%.

The ring and hub may exhibit an interference fit.

This may advantageously increase the extent of the above reinforcement in that the hub and ring can be arranged in a "pre-stressed" state.

A ring and a hub may be considered to exhibit an interference fit if before assembly of the die, the outer diameter of the hub is larger than the inner diameter of the ring.

At least part of the hub may be harder than at least part of the ring.

This may be beneficial in allowing those parts of the hub and the ring to be made of different materials. For example, said part of the hub to be made of a material which is advantageously resistant to wear (for instance a particularly hard material), without affecting the material from which said part of the ring is made. Said part of the ring can therefore be made of a softer and/or more resilient material, allowing it to be less brittle and/or to exhibit improved hoop strength.

Said part of the hub may be substantially all of the hub, and/or said part of the ring may be substantially all of the ring.

The cavity may be defined entirely within said part of the hub.

In many arrangements the cavity of a die is the portion which experiences the most severe wear, since it is this portion within which workpiece material flows (and therefore generates friction). The ability to make the cavity wear resistant without affecting the performance of the ring may therefore be particularly beneficial.

The cavity being defined entirely within the hub may also avoid the cavity comprising a seam between the hub and the ring. Such a seam may obstruct the flow of workpiece material in the cavity, and/or may allow workpiece material to damage the die by penetrating between the hub and the ring.

Said part of the hub may include at least a portion of a central pip.

In many arrangements the pip of a die is the portion which experiences the most severe wear, since it is this portion which directs the flow of workpiece material. The ability to make the pip wear resistant without affecting the performance of the ring may therefore be particularly beneficial.

The cavity may be co-operatively defined by the ring and the hub.

The ring and the hub define a mutual axis and are movable axially relative to one another so as to adjust the volume of the cavity.

The ability to adjust the volume of the cavity may be beneficial in allowing the same die to be adapted to perform optimally in different conditions (i.e. when forming joints in workpieces of different thickness and/or material composition, and/or joints made using rivets of different geometry).

The hub may be movable relative to an axially stationary ring, the ring may be movable relative to an axially stationary hub, or both the hub and ring may be movable.

The hub and/or the ring may be movable directly by an actuator (for instance by virtue of being mounted on the output shaft of a linear actuator such as a hydraulic cylinder or an electric linear actuator). Alternatively or in addition, the hub and/or the ring may be movable indirectly by an actuator (for instance a linear actuator, or a rotary actuator such as a hydraulic or electric motor) through a linkage.

The hub may comprise a circumferentially segmented portion.

Due to the precise and complex shape of the die required in many applications, the use of multiple segments may allow the die to be manufactured with advantageous ease and/or speed. As an example, if the die were to have an overhang around its circumference, grinding of the die cavity would be extremely difficult since the grinding tool would have to reach underneath this overhand. In contrast, if the die was arranged so that the overhang was provided by the segmented portion, the required shape could be cut into each segment separately before assembling the die.

Where the hub comprises a circumferentially segmented portion, the cavity is preferably defined entirely within the hub.

All or substantially all the hub may be circumferentially segmented.

The circumferentially segmented portion may be positioned circumferentially around a core portion which defines at least part of a central pip.

Said part of the central pip may be substantially all the pip.

At least part of the pip being defined by a central core portion may provide the pip with advantageously increases strength. If the pip itself was entirely circumferentially segmented, it may be relatively fragile because individual segments thereof may be more easily damaged. Further, the part of the pip which is provided by the core portion would not have a seam between segments. Such a seam may allow workpiece material to damage the die by penetrating between the hub and the ring, particularly given the high forces with which workpiece material can be urged against the pip.

The die may be configured to hold the segments of the circumferentially segmented portion stationary relative to one another during normal use.

This may allow the shape and volume of the cavity to remain constant, thereby increasing the repeatability of joints produced by said die.

Alternatively, the die may be configured to allow the segments to move relative to one another (for instance generally radially outwards) during a riveting operation. This may be advantageous in allowing the die cavity to expand and accommodate more workpiece material, which may be required if the die is used for several different types of joints. It may also be beneficial in arrangements where the punch driving the rivet is prone to over-travel (which would urge more workpiece material into the die cavity than was intended), because the segments moving relative to one another may prevent the die from bursting under such conditions. The segments may be movable relative to one another against a resilient bias (allowing the segments to return to their original position without intervention) or the die may be configured whereby the segments remain in the relative position to which they were moved (allowing it to be identified easily when the segments have or have not been moved).

The die may further comprise a gas bleed passage which extends from a first end in communication with the at least one gas passage, to a second end which is sealed substantially closed by a junction between two segments of the circumferentially segmented portion.

The die having a gas bleed passage positioned in this way may allow it to be detected if the segments defining said junction have moved relative to one another. This may be advantageous in detecting if segments have moved at all in a die which configured to hold them stationary. In a die configured to allow relative movement of the segments, such a bleed passage may allow the extent of relative movement of the segments, and/or whether or not the segments have returned to their original position, to be monitored.

At least a portion of the die may be rotatable about a longitudinal axis defined by the die.

The die having a rotatable portion may allow the die to apply friction stir heating to a workpiece supported thereon, thereby softening the workpiece. A die which can apply friction stir heating to a workpiece can be subjected to particularly high frictional forces and thermal shock, therefore the ability to monitor such a die may be particularly beneficial.

In a die where at least a portion of the die is rotatable about a longitudinal axis, said die may be a multi-piece assembly comprising a radially outer ring positioned circumferentially around a radially inner hub, at least one of the ring and the hub being rotatable.

Where the ring and hub are both rotatable, they may be rotatable at different speeds and/or in different directions, or may be rotatable in unison.

As an alternative, the die may be of single piece construction and may be rotatable in its entirety, or the die may be a multi-part assembly of a different form.

The die may further comprise at least one gas bleed passage which extends from a first end in communication with the at least one gas passage, to a second end which is sealed substantially closed by the first surface.

The second end of the gas bleed passage may be considered to be sealed by the first surface if the gas bleed passage terminates at a distance of no more than 1 mm from said surface. For instance, the gas bleed passage may terminate at a distance of no more than 0.8 mm or no more than 0.6 mm from the first surface.

In some embodiments it may be preferable for the gas bleed passage to terminate a relatively large distance from the first surface while still being sealed by the first surface. For instance, the gas bleed passage may terminate at a distance of no less than 0.2 mm, for instance no less than 0.3 mm, no less than 0.4 mm or no less than 0.5 mm, from the first surface. This may improve ease of manufacture of the die, and reduce the extent to which the presence of the gas bleed passage introduces a weak point on the first surface.

The die may comprise a central pip, and the second end of the at least one gas bleed passage may be sealed substantially closed by a portion of the first surface which defines the pip.

This may be beneficial in that the gas bleed passage is positioned to detect wear of the die in a region which is conventionally subject to particularly high rates of deterioration.

Alternatively, the gas bleed passage may be sealed substantially closed by a different portion of the first surface, for instance a portion of the first surface which defines a different portion of the cavity, or a portion of the first surface which does not define the cavity.

At least part of the portion of the first surface which defines the pip may be harder than at least part of the remainder of the first surface.

As outlined above, the pip is conventionally subject to particularly high wear. At least part of the first surface on the pip being harder than another part may therefore increase the resistance to wear of the die as a whole, without placing constraints on other portions of the first surface.

Said part of the portion of the first surface which defines the pip may be substantially all said portion. Similarly, said part of the remainder of the first surface may be substantially all the remainder of the first surface.

According to a second aspect of the present invention there is provided a method of manufacturing a die for a die assembly according to the first aspect of the invention using additive manufacturing, the method comprising:
- building up a main body of the die by depositing successive layers of a first material on a support platen;
- providing gaps in at least some of said layers so as to provide at least a portion of said at least one gas bleed passage;
- building up a wear resistant portion by depositing successive layers of a second material, at least the portion of the part of first surface which closes the gas bleed passage being defined on the wear resistant portion, the second material being harder than the first material.

Use of additive manufacture in this manner may allow a die to be produced with a gas bleed passage that has a shape that is unsuitable for traditional manufacturing methods such as machining or casting (for instance a gas bleed passage which is particularly narrow, or which does not follow a straight path). Furthermore, due to the precise geometric tolerances required of dies in some circumstances, using additive manufacture in this way may reduce the time and/or cost of producing such a die.

The method may further comprise a finishing operation such as polishing or finish grinding.

Said die may further comprise at least one gas bleed passage which extends from a first end in communication with the at least one gas passage, to a second end which is sealed substantially closed by the first surface.

Said die may comprise a central pip, and the second end of the at least one gas bleed passage is sealed substantially closed by a portion of the first surface which defines the pip.

The layers of the second material may be deposited on the main body.

The layers of the second material may be deposited on the main body once production of the main body is complete. Alternatively, the layers of second material may be deposited on the main body while layers of the first material are also being deposited (for instance layers of the first material and layers of the second material may be deposited simultaneously or alternately).

The layers of the first and/or second material may each be formed by depositing an array of molten beads of said material.

The layers of the first and/or second material may each be formed by fusing or binding together portions of a granular bed of said material.

The conduit may be elongate for connection to a remote pressure source. It may be an integral part of a housing of the source of pressurised gas or, alternatively, the source of pressurised gas may be connectable directly or indirectly to the inlet of the conduit. Similarly the sensor may be connected, directly or indirectly, to the inlet of the conduit or it may be connected to any part of the at least one gas passage.

The sensor may be connectable to a controller that is able to determine a condition of the die from the detected magnitude of the pressure or flow rate.

There may be provided at least one further gas passage that extends into the die. The further gas passage may extend to a location that is proximate the die cavity. The die may be a friction fit or otherwise received in a recess in the die holder. The at least one further gas passage defined in the die may not extend all the way therethrough and may be closed at its first end by virtue of being a blind passage. In other words it is closed by a portion of the die which is not penetrated by the at least one further gas passage.

The die holder may be defined by part of a frame that supports a setting tool. Alternatively, it may comprise a die adapter between the die and a support member which may be a part of a frame that supports a setting tool. In either case, the frame may be a C-frame with a pair of arms, a first arm being disposed over a second arm in a spaced apart relationship, the first arm supporting a setting tool and a second arm defining the die holder.

The die adapter may comprise a body having a first end and a second end. The die may be supported in the first end and at least of the at least one gas passage may extend between the first and second ends.

The die may comprise a head in which the die cavity is defined and a stem extending from the head in a direction away from the die cavity, the stem of the die being received in a first bore in the first end of the die adapter body.

A first portion of the at least one gas passage may be defined between the stem of the die and the first bore and a second portion of the at least one gas passage extends between the outlet of the conduit and the first portion.

The second portion of the at least one gas passage may be in the form of a second bore.

The first and second bores may be substantially cylindrical with the first bore having diameter that is larger than that of the second bore.

The body may have a flange for seating on the support member.

The second portion of the at least one gas passage may extend from the second end of the die adapter body to the first portion of the at least one gas passage and it may extend from the flange to the first portion. The second portion may comprise a first part that extends from the second end of the die adapter to the first portion of the at least one gas passage and a second part that extends from the flange to the first portion.

There may be a washer disposed between the die head and the die holder. The die head may define a second surface, which is opposite the first surface on which the cavity is defined, the washer being disposed between the second surface and the die holder. The second surface may be immediately adjacent to the die stem. A first surface of the washer may face the second surface of the die head and an opposed second surface may face the die holder. The facing surfaces may be in contact. One or both of the first and second surfaces of the washer may define one or more gas paths which may each be in the form of a groove (including a recess or the like), the gas paths forming at least part of the at least one gas passage. The washer may have inner and outer peripheral surfaces that extend between the first and second surfaces. There may be provided at least one gas path that extends in a radial direction from the inner peripheral surface towards the outer peripheral surface. There may be a plurality of such radial gas paths that extend from the inner peripheral surface to a substantially annular gas path defined towards the outer peripheral surface.

In one embodiment, the second surface of the die head may define one or more gas paths of the kind defined above. In this particular embodiment the washer need not be present.

There may be a clearance between die stem and a wall that defines the at least one gas passage, the clearance may extend along the length of the die stem so as to provide a gas path. The clearance may be provided by a flat along the length of the die stem or, alternatively by a groove defined along the length of an external surface of the die stem or in the wall that defines the at least one gas passage in which the die stem is received.

In one embodiment a sleeve is provided over the outer periphery of the washer and the die head, the sleeve being deformable outwardly. In this embodiment the washer may have one or more gas paths defined on its first surface only. The gas paths may comprise one or more radial grooves that extend from the inner peripheral surface to the outer peripheral surface. In the event of die breakage the sleeve may be deformed outwardly by the broken part of the die so as to provide a clearance between the sleeve and the die head. In use, this may afford a leak path as the gas flows along the gas path or paths, along the clearance to atmosphere thereby resulting in a drop in back pressure or an increase in the flow rate detected by the sensor. Alternatively, in the instance where a negative suction pressure is applied the gas may flow from atmosphere into the clearance and along the at least one gas passage.

The die may be fixed in the die holder by means of a fixing member such as a grub screw or the like. The fixing member may be located in a fixing bore in the die holder which may be in gas communication with the at least one gas passage such that if the fixing member is not present or is only loosely fitted the fixing bore provides a leakage flow path. The amount of leakage determined from the detected back pressure or flow rate may be of such a value that it can be attributed to this condition (i.e. the absence or incorrect fitting of the fixing member).

In one embodiment the die may comprise at least two separable parts: a die stem and a collar. The die stem may have a flange on which the collar is mounted. The collar may have a depending skirt that extends over at least a part of the depth of the flange. The die stem may have a gas bleed passage for gas communication with the at least one gas passage. The gas bleed passage may extend from an interface between the die holder and the die to an interface between the die stem and the collar. It may extend across the depth of the flange. The die stem may have an upper surface defining a part of the die cavity, the upper surface may define a die protrusion or nub that serves to guide flaring of the rivet during deformation. The collar may have an inner annular surface that defines a part of the die cavity.

Also disclosed herein is a method for detecting the condition of a die for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change a condition of the die.

This method may be practiced on a die assembly according to the first aspect of the invention.

The gas may be directed into the at least one passage with a positive gas pressure in which case a change in back pressure is detected to determine the condition of the die. Alternatively a negative gas pressure may be applied to the at least one gas passage and a reduction in the magnitude of the negative pressure or an increase in flow rate may be detected. In each of the cases any suitable gas pressure or flow rate sensor may be used.

By determining the change in the pressure or flow rate in the at least one gas passage conclusions may be made regarding the condition of the die. For example, the method may be used to determine if the die has failed as a result of fracture, cracking or breakage, it may determine that the die is absent completely, that the die is not located properly in the holder, or simply that it is a loose fit in the holder. The method may be performed in such a manner that the determined condition is either indicative of the die being present and operational or that it is not operational in some way. Alternatively, it may be able to make a more refined statement regarding the die condition by identifying why the die is not operational e.g. it may determine from the sensed pressure or flow rate that the die is not present or is broken, or alternatively that the die is a loose fit in the holder.

This method relies on using at least one gas passage in the die holder to apply positive or negative gas pressure to the first end where the die closes the passage. The passage may be closed by means of a sealing member of the die and disposed such that it seals against the die holder (or an intervening member) or simply by means of a tight engagement (e.g. a friction fit) between the die and die holder (or an intervening member). Thus the condition of the die can be determined when it is in place (or at least should be in place) in the die holder rather than having to move and present a separate component associated with a sensor to the die. The pressure or flow rate sensor detects whether there is a change in pressure or flow rate of the gas flow delivered from the source as a result of leakages past the die. The fact that the die serves to close the gas passage means that it seals or at least partly seals the passage so as to prevent or restrict the passage of the gas across it. Thus when a die is correctly fitted to close the passage in the holder the pressure is relatively high in magnitude (whether positive or negative) and the flow rate of the gas is relatively low. If the die becomes loose or damaged, gas may be able to escape past the die more easily, the pressure is reduced and the flow rate increases. In this case if positive pressure is applied to the at least one gas passage the back pressure is reduced or if negative pressure is applied its magnitude is reduced as a result of gas from the surrounding environment entering the at least one passage. In this arrangement, the detection process is not reliant on the presence of a workpiece over the die to determine the die condition. In is to be understood that the at least one gas passage may be partially defined between the die and die holder.

A statement regarding die condition may be determined from comparing an absolute value of pressure or flow rate magnitude of the gas to a predetermined threshold value or simply by detecting a reduction in the pressure magnitude or flow rate compared to a previously measured magnitude.

The gas may be air and the pressure sensor may be an air catch sensor. There may be a source of gas that is proximate to the pressure sensor or otherwise. The gas may be directed to or from the at least one gas passage via a conduit such as, for example, a flexible hose. Alternatively it may be connected directly to the at least one gas passage.

The die may comprise a head defining the die cavity and a stem extending from the head. The stem of the die may be supported in the die holder.

The method may be for detecting the condition of the die in situ in apparatus for deforming material. The die may be supported opposite a deforming tool which may be a rivet setting tool, the rivets being inserted into the material and being upset in the die. The deforming tool and the die may be for self-piercing riveting in which the rivets pierce into the material but do not penetrate all the way therethrough.

Also disclosed herein is a method for detecting a loose die, the die being of the kind for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change whether the die is loose.

This method may be practiced on a die assembly according to the first aspect of the invention.

According to a third aspect of the present invention, there is provided a method for manufacturing a riveted joint by inserting a rivet into material, the method comprising:

providing a die assembly comprising a die having a first surface defining a die cavity in which material is to be deformed, a die holder in which the die is supported such that the die is operational with the die cavity being exposed for receipt of material, at least one gas passage being defined at least partially by the die holder, the at least one gas passage extending to a first end located between the die and the die holder, the first end being sealed substantially closed by at least a portion of the die;

supplying pressurised gas from a source to an inlet of a conduit having an outlet in fluid communication with the at least one gas passage;

driving the rivet into the material and towards the die such that a shank of the rivet pierces the top sheet and then flares outwardly in the die such that the material forms an annulus in the die cavity that encapsulates the shank; and detecting the pressure or flow rate of the gas in the at least one gas passage using a sensor.

The pressure or flow rate of the gas in the at least one gas passage may be detected whilst the rivet is being driven into the material. For example, the pressure or flow rate of the gas in the at least one gas passage may be detected at a point during the driving of the rivet which is during or after the time in which the shank of said rivet is flaring outwardly in the die. Alternatively or in addition, the pressure or flow rate may be detected at any other suitable point in time.

The method of the third aspect of the invention may further comprise triggering an alert condition if the detected pressure or flow rate of the gas in the at least one gas passage is within a predetermined range.

Triggering the alert condition may comprise discontinuing use of the die assembly.

BRIEF DESCRIPTION OF THE DRAWINGS

Specific embodiments of the present invention will now be described, by way of example only, with reference to the accompanying drawings in which:

FIG. 10 is a perspective view of a C-frame fitted with a die and die holder in accordance with the present invention;

FIG. 11 is an enlarged view of the die and die holder of FIG. 10;

DESCRIPTION

Figure 1:
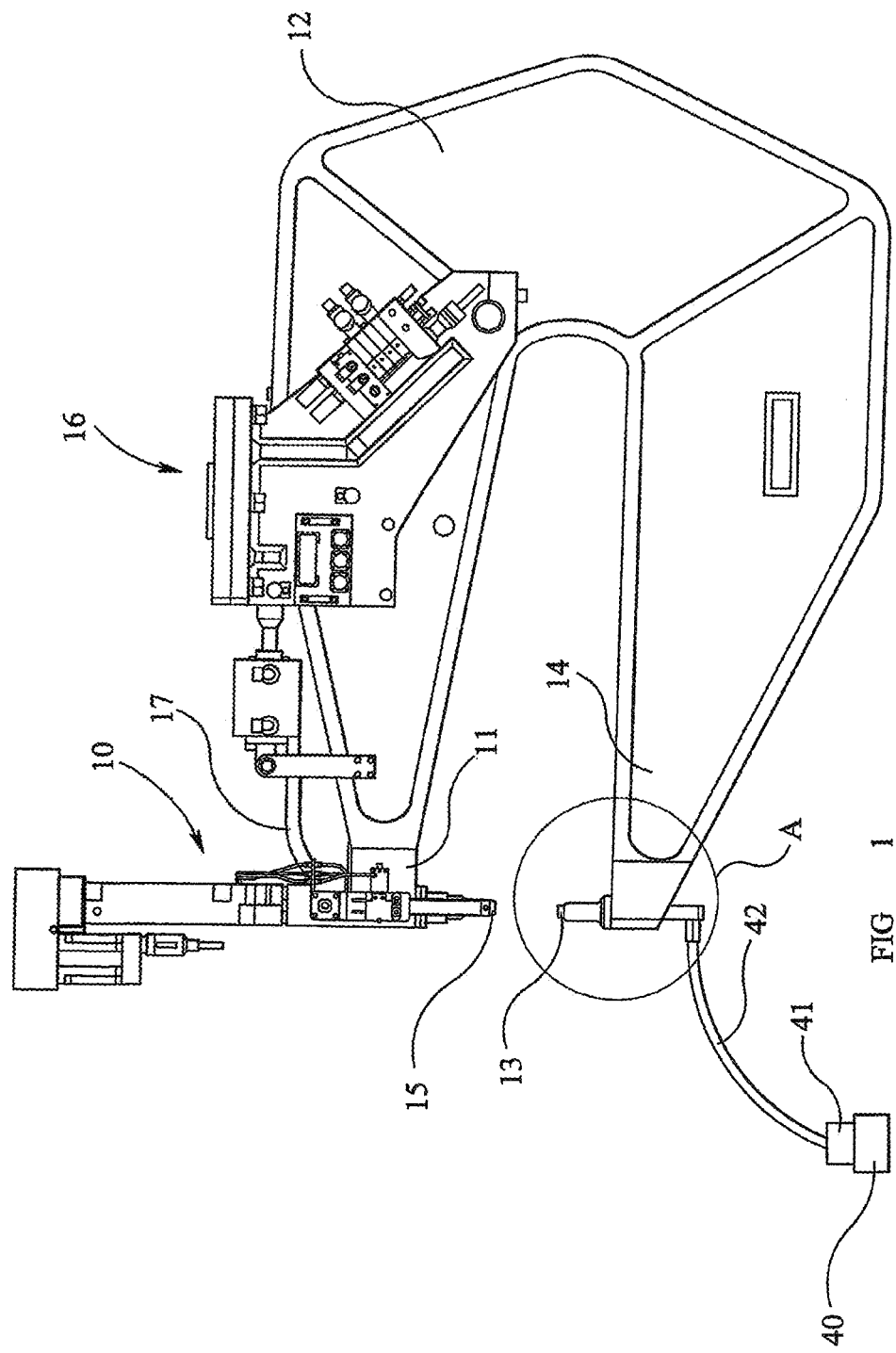
FIG. 1 is a side view of rivet setting apparatus including a rivet setting tool supported over a die assembly in a C-frame, in accordance with the present invention.

Referring now to FIG. 1 of the drawings, a rivet setting tool 10 is mounted on an upper arm 11 of conventional C-frame 12 above a rivet-upsetting die 13 supported in the lower arm 14. Rivets (not shown in FIG. 1) are inserted by the tool 10 into a workpiece (not shown) supported over the die 13 as is well known in the art. The surface of the die on which the workpiece is supported, and in which the cavity (discussed below) is provided, is referred to herein as the first surface of the die. The tool 10 is operable such that a lower nose end 15 moves downwards to engage and optionally clamp the workpiece and then a punch is extended so as to insert the rivet. It is to be appreciated that whilst the specific embodiment described herein relates to the insertion of rivets it has application to the formation of other joints including joints using other fasteners that are inserted into a workpiece using a die such as, for example, slugs, and also a clinching operation in which a punch of the setting tool is used directly to deform the material into the die to form a mechanically interlocked joint which may or may not then be supplemented with a fastener.

The C-frame 12 is mounted on a robot manipulator (not shown) such that it is movable with the tool 10 by the robot towards and away from the workpiece as required. A mounting bracket 16 is provided on the C-frame 12 for connection to the robot manipulator. A suitable rivet delivery system (not shown) is provided and is designed to supply rivets to the setting tool in a predetermined and controllable fashion from a bulk source (not shown). This may be achieved by, for example, using a compressed gas delivery system that propels the rivets along a tube or track or by a tape drive system in which rivets are supported in a tape that is wound on a spool and fed to the setting tool. The tool and feed apparatus are operated by a controller (not shown in the figures) in the form of microprocessor-based hardware and operational software. Such rivet delivery and control systems are well known and will not therefore be described herein.

Figure 2:
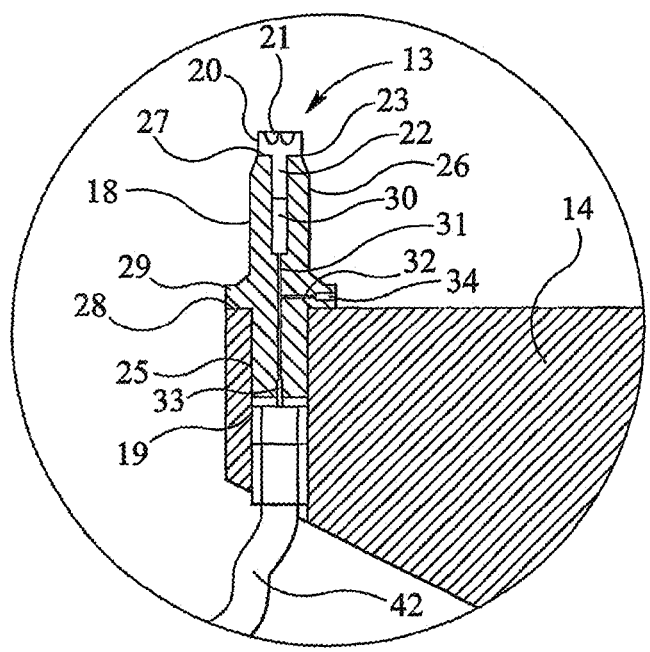
FIG. 2 is a sectioned view through that part of the apparatus of FIG. 1 that is encircled and labelled A.

The die 13 shown in FIGS. 1 and 2 is of conventional configuration but is supported on the lower arm 14 of the C-frame 12 by a die holder adapter 18 that is received in a bore 19 through the arm 14. The die 13 is generally cylindrical with a head 20 defining an open die cavity 21 for facing the setting tool 10 and a depending stem 22 that is of reduced diameter compared to the head 20 such that an annular surface 23 extending radially relative to the central axis of the die is defined on the underside of the head 20. The adapter 18 has a generally cylindrical body with a first end 25 that is received in a snug fit in the bore 19 in the arm 14 of the C-frame 12 and a second hollow end 26 that receives the die stem 22 such that the annular surface 23 of the die is seated on an upper surface 27 of the second end 26. A sealing member such as, for example, a O-ring or the like may be provided between the adapter 18 and an upper surface 28 of the surface of the arm 14 in which the bore 19 is defined. The adapter body has a radially outward extending flange 29 defined part way along its outer surface with one of the radially extending faces being seated on the upper surface 28 of the arm 14 immediately around the bore 19. The second hollow end 26 is tapered inwardly and terminates in the annular upper surface 27 on which underside surface 23 of the head 20 is supported. A cylindrical bore 30 extends within the adapter body from the second end 26 to a position substantially half way along its length and receives the die stem 22 in a slip fit or friction fit. The body is also penetrated by two small diameter passages: a first 31, which extends along a central longitudinal axis of the body from the first end 25 to the cylindrical bore 30, and a second 32 that extends radially from the first passage 31 to the periphery of the flange 29. In each case the passages have respective enlarged first and second entry ports 33, 34 to allow connection to a hose for the supply of pressurised air.

In FIGS. 1 and 2, the first entry port 33 of the die adapter 18 is connected to a pneumatic source 40 and an air catch sensor 41 via a suitable air hose 42. The sensor 41 has an outlet nozzle that is connected to an inlet end of the hose 42 and delivers air to the adapter 18. The sensor 41 is operative to detect decreases in the air pressure flow from the outlet nozzle as a result of the reduction in back pressure as a result of leakage paths caused by the absence of all or part of the die 13 in the adapter 18, or simply by virtue of a loose fitting die. Air catch sensors of this kind are known in the art and a suitable example for this application is available from SMC Corporation of Tokyo, Japan such as, for example, those available under general part no. ISA 2. An alternative sensor for sensing the flow rate of the gas may be used instead.

Under normal operation, when a die 13 is present and secured in place in the adapter 18 the air catch sensor 41 will detect a relatively high back pressure in view of the close fit and/or sealed relationship between the die 13, the adapter 18 and the arm 14 of the C-frame 12. If the die 13 is absent the back-pressure will be negligible as air is able to leak out through the small diameter passages 30, 31 to atmosphere. The lack of significant back-pressure is detected by the sensor 41 and a signal indicative of the absence of the die 13 is generated and transmitted to the controller which can issue an alarm. Alternatively, if part of the die head 20 is missing, the die 13 is only loosely fitted in the adapter 18, or the adapter 18 is loosely fitted in the bore 19, the leak flow path is less restricted than normal and a back pressure of reduced magnitude is sensed. A signal indicative of a broken or faulty die is then generated and transmitted to the controller so that a suitable alarm can be generated.

The configuration of the assembly of the die 13 and the die holder adapter 18 allows a statement to be made regarding the condition of the die either by comparing an absolute value of the sensed back-pressure magnitude with a predetermined threshold value or simply by detecting a reduction (of a predetermined magnitude) in the back-pressure compared to a previously measured magnitude.

It is to be appreciated that if the bore 19 in the lower arm 14 of the C-frame is modified to provide an air-tight connection with the end of the hose 42 the die holder adapter 18 may be eliminated in certain embodiments in which case the lower arm of the C-frame in the region around the bore 19 serves to hold the die directly.

Figure 3:
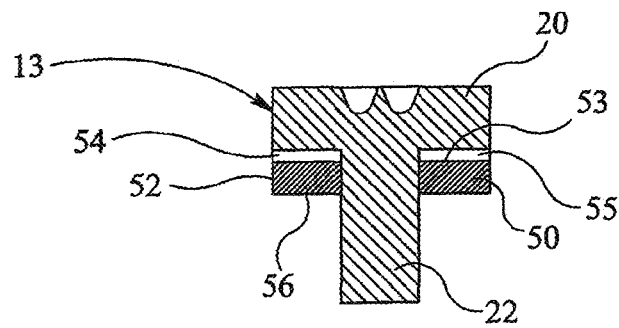
FIG. 3 is a sectioned side view of a die shown with a washer support in accordance with the present invention.
Figure 4:
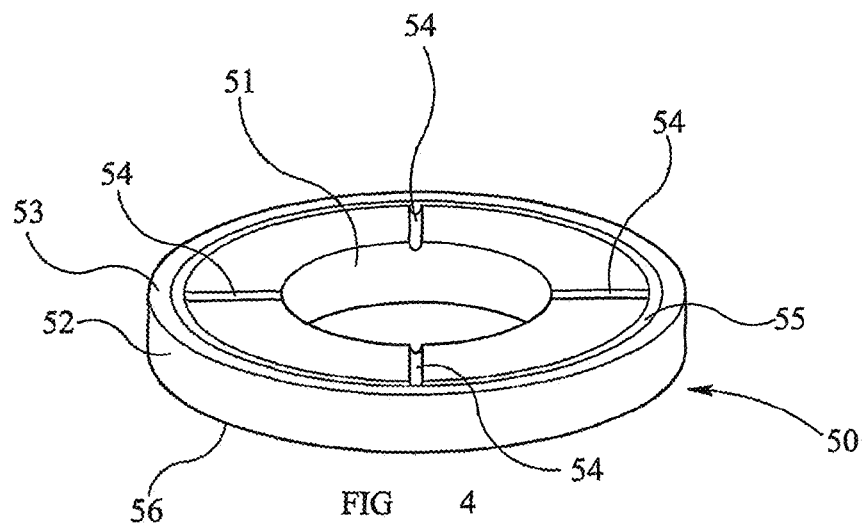
FIG. 4 is a perspective view of the washer support of FIG. 3.

An alternative die arrangement is depicted in FIGS. 3 and 4. This embodiment can be used with the die adapter 18 of FIGS. 1 and 2 or can be mounted directly into a reduced diameter bore in the lower arm of the C-frame without an adapter. The die 13 is supported on an annular washer 50 having an inner edge 51, an outer peripheral edge 52, an upper surface 53 (for facing the die) that has a plurality of shallow channels 54, 55 formed therein and a lower surface 56 for abutment with the adapter 18 or the arm 14 of the C-frame 11. In the particular embodiment shown in the figures, there are four substantially radial channels 54 that extend from the inner edge 51 to a circular channel 55 formed towards the outer peripheral edge 52 of the washer 50. In use the channels 54, 55 are in communication with the air supply via the hose 42, the small diameter passages 31, 32 and bore 30 in the adapter 18 (if present) and a leak passage or clearance past the die stem. They thus provide a potential air leak path that runs close to the outer periphery of the die head 20. If the die 13 is present and its annular surface 23 is sealed in place against the periphery of the upper surface 53 of the washer 50 the air channels 54, 55 are effectively closed by the die as they are not in fluid communication with the atmosphere and negligible air leakage occurs. On the other hand, if a fracture takes place at the head 20 of the die 13 in a radial position that is distal from the die stem 22 then, provided the missing part of the die head 20 encompasses the annular surface 23 on the underside of the die head 20, air can leak past the die 13 and a reduced back pressure (or an increased flow rate if a flow rate sensor is used) is detected. Similarly, if the die is loosely fitted air can leak past resulting in a reduced back pressure and increase flow rate. It will be appreciated that the washer 50 may have a similar array of channels 54, 55 formed on its lower surface 56 if desired so that it does not matter which way up it is installed. The washer could be retro-fitted or may be supplied pre-attached to each die.

Figure 5:
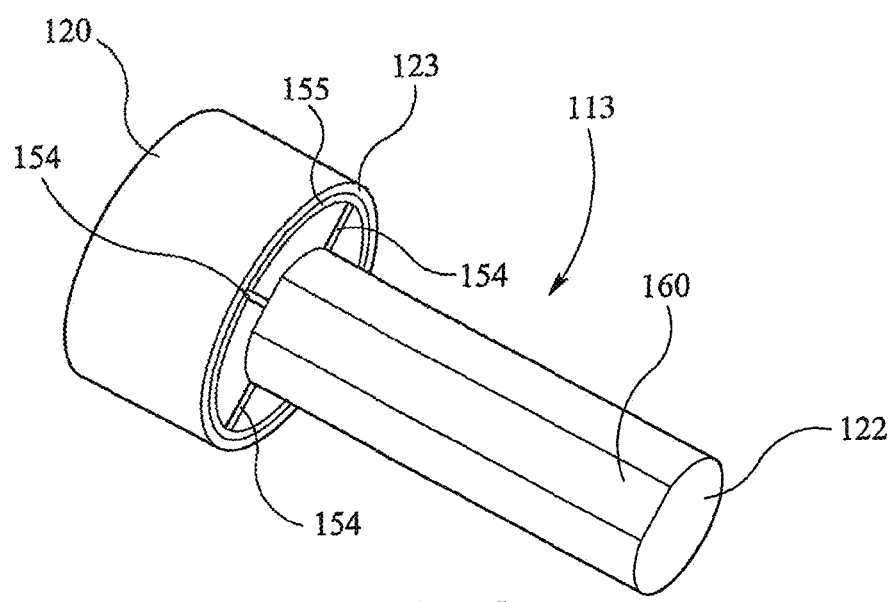
FIG. 5 is a perspective view of an alternative embodiment of the die in accordance with the present invention.

In a further die embodiment 113 shown in FIG. 5, the channels 154, 155 are formed in the annular surface 123 on the underside of the die head 120. This die 113 may be used with the adapter 18 or mounted directly into the bore 19 of the C-frame arm 14 as before. In addition, this particular die 113 is shown with a flat surface 160 along the length of its stem 122. Once the die 113 is supported in the cylindrical bore 30 of the adapter 18 or in the bore 19 of the C-frame arm 14 the clearance between the flat 160 and the wall of the bore 30 or 19 affords a leak path to allow air to flow up to the channels 154, 155. This feature may be incorporated in any of the die embodiments shown in the figures. It will be appreciated that the flat 160 may be replaced with a groove, recess, channel or the like in the surface of the stem to allow for the flow of air.

Figure 6:
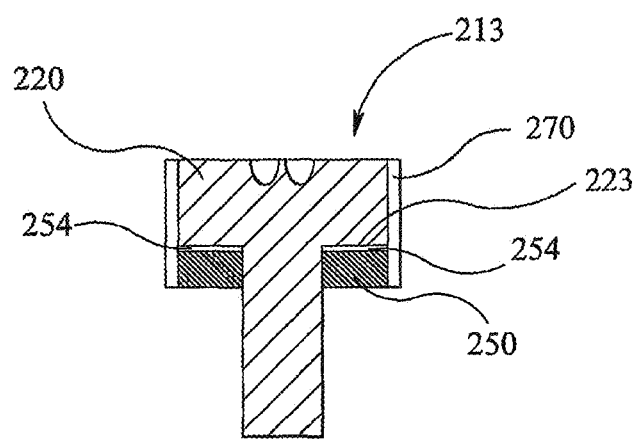
FIG. 6 is a sectioned side view of a second alternative embodiment of a die and support in accordance with the present invention.
Figure 7:
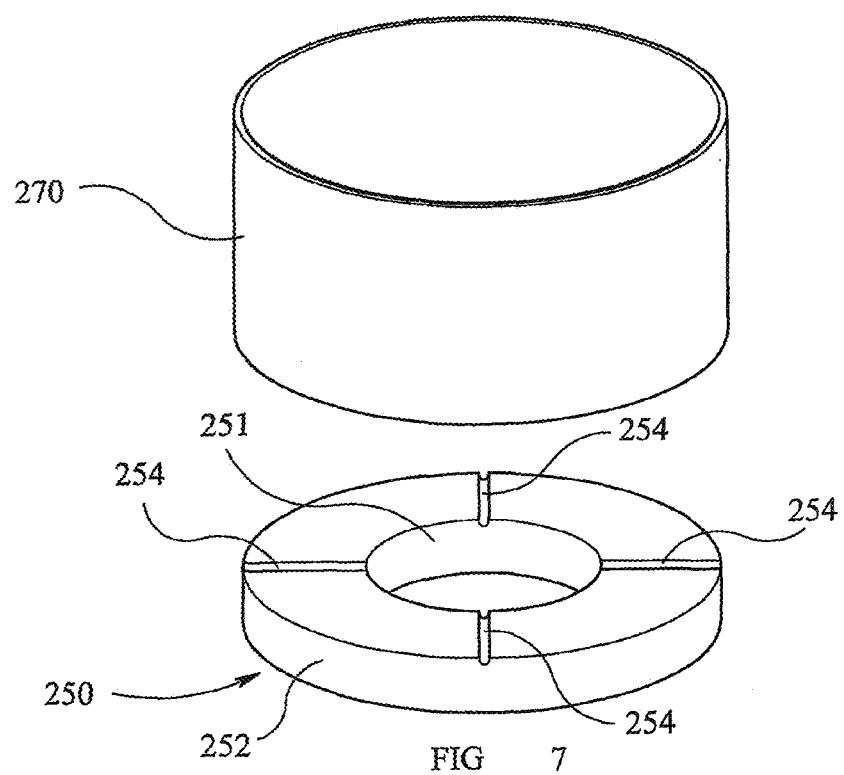
FIG. 7 is a perspective exploded view of the support of FIG. 6.

The embodiment of FIGS. 6 and 7 comprises a die 213 with a washer 250 similar to that of FIGS. 3 and 4. However, in this instance the radial channels 254 in the upper surface of the washer run between the inner and outer peripheral edges 251, 252 and there is no circular channel. A thin metallic cylindrical sleeve 270 is press-fitted over the outer peripheral edges of the washer 250 and the die head 220 so as to close the channels 254. In the event of breakage of the die head 220 the sleeve 270 will be deformed outwards so as to provide a clearance between the die head 220 and the sleeve 270, thereby allowing a leak path to open. The air leak path thus travels from the supply, through the hose 42, the small diameter bores 31, 32 and bore 30 in the adapter 18, the channels 254 in the washer and between the die head 220 and the sleeve 270 (or between the broken parts of the die head). This arrangement has the benefit that breakage may be detectable even if it does not extend to the annular surface 223 on the underside of the die head. Moreover, the sleeve 270 helps to retain the broken die parts and may serve to prevent the rivet joint from distorting to an extent where it is unsatisfactory. The sleeve 270 may be replaced by a tightly wound coil spring or the like.

Figure 8:
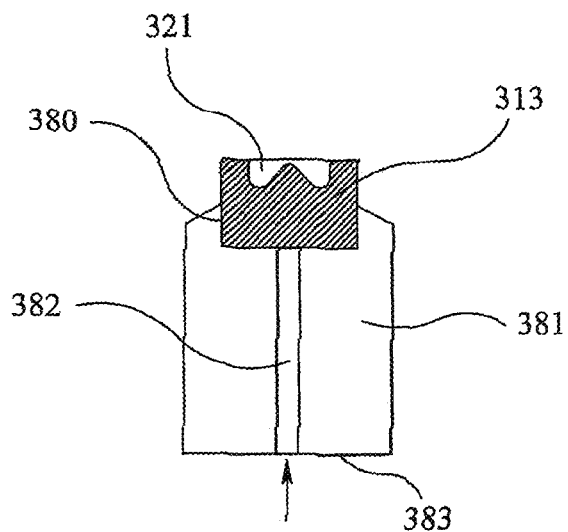
FIG. 8 is a sectioned side view of a third alternative embodiment of a die and die holder in accordance with the present invention.

In the embodiment of FIG. 8, the die 313 has no stem and the head 320 is received in a recess 380 in a die holder 381 in a tight fit such as a friction, press or slip fit. Alternatively or in addition it may be retained in the recess 380 by a suitable screw. As before, the die has an upper surface for facing the setting tool and in which a die cavity 321 is formed. The holder 381 may be an adapter for fitting in a bore in the C-frame as in the manner of the embodiment shown in FIGS. 1 and 2 or may, alternatively, be an integral part of the C-frame. The length of the die holder 381 is penetrated by a bore 382 that extends between the recess 380 and an opposite end 383. In use the bore 382 is connected, directly or indirectly, to pneumatic source and an air catch sensor via a suitable air hose as in the preceding embodiments. In order to detect whether die failure has occurred air is directed into the bore 382 as indicated by the arrow.

Figure 9:
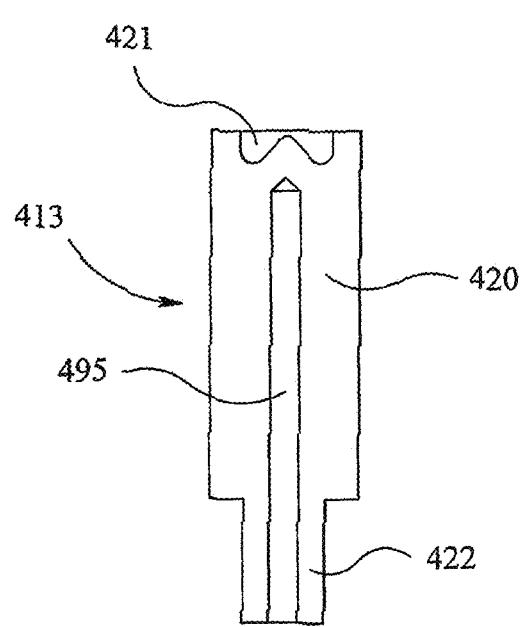
FIG. 9 is a section side view of a fourth alternative embodiment of a die in accordance with the present invention.

FIG. 9 illustrates an alternative die configuration in which the die 413 itself is penetrated by a passage for connection to the sensor. The die may take any suitable form but in this particular embodiment the die has an elongated head portion 420, an upper surface of which defines the die cavity 421, and a short stem 422 for receipt in a recess or bore in a die holder (not shown) being either an adapter or part of the C-frame. A single passage 495 extends up the stem 422 and the head 420 along a longitudinal axis of the die and terminates a short distance from the die cavity 421. In use, the passage is in fluid communication with the fluid passage and/or bore in the die adapter or C-frame and therefore with the pneumatic source and air catch sensor. More than one passage 495 may be provided and it will be appreciated that the precise configuration of the passage or passages may vary. If this die should fracture in the region around or under the die cavity 421 it will expose the passage or passages in the die thereby affording leakage. The reduction in back pressure or increase in flow rate will be detected as before so that a die condition statement can be made.

In all embodiments the sensor may located at any convenient location which may be proximate the die and the die holder or may be distal therefrom. If the C-frame and setting tool are robot-mounted it may be convenient for the pressure sensor to be located outside of the robot cell.

The source of pressurised gas may be connected directly to a gas passage in the C-frame or in the die adapter rather than using an elongate flexible conduit.

A further alternative embodiment of a die adapter is shown in FIGS. 10 and 11. In this embodiment the die holder (adapter) 518 is fixed to the lower arm 514 of the C-frame 512 at a bottom flange 529 and extends upwardly to an open end in which the die 513 is received so as to close the internal gas flow passages (not shown). The flange 529 has an upper arcuate surface that merges with an upper end of the die holder 518. The die 513 is retained tightly in place in the adapter 518 by a grub screw 596 that extends through the wall of the adapter. Gas in introduced into the adapter 518 at a side port 534 in the arcuate surface of the flange via a flexible hose 542 connected thereto. The port 534 is in fluid communication with the gas passage that extends to the die 513 as before. If the grub screw 596 is omitted it leaves a gas leakage path to atmosphere which would be detected by sensing a reduction in the back pressure or an increase in the gas flow rate. It is to be understood that the grub screw feature may be used in conjunction with the die adapters described in preceding embodiments.

Figure 12:
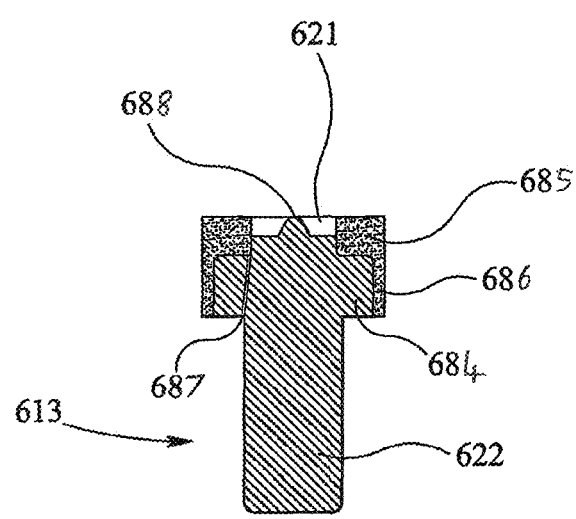
FIG. 12 is a sectioned side view of a further alternative embodiment of a die in accordance with the present invention.

In FIG. 12 there is shown an alternative die embodiment for insertion into a die holder of any of the kinds described above. This particular die 613, is in two parts, with a stem 622 having a radially outwards extending flange 684 that supports an annular collar 685. An upper surface of the stem 622 and an inner surface of the collar 685 combine to define the die cavity 621. The collar 685 has a depending skirt 686 that is substantially coterminous with the depth of the flange 684 and ensures the collar is securely mounted on the stem 622. In order to detect whether die failure has occurred gas is directed through a gas passage in the holder and into a bleed hole 687 defined in the flange 684 of the stem 622. The bleed hole 687 extends across the depth of the flange 684 from the interface with the die holder to an interface with the collar 685. The upper surface of the stem 622 may define a protrusion, nub or pip 688 that is designed to direct the flow of workpiece material into and within the cavity 621, thereby ensuring that the rivet is upset appropriately during rivet insertion and deformation of the workpiece. The pip 688 projects from the centre of the cavity 621, giving the cavity an approximately annular shape. Although in this embodiment the pip 688 terminates level with the top surface (from the perspective of FIG. 12) of the die 613, in other embodiments it may terminate beneath this surface or project beyond that surface. Further, in some embodiments the die may not have a pip (for instance the cavity may be generally cylindrical in shape).

The two-part die configuration of FIG. 12 is designed particularly to avoid premature die failure.

Figure 13:
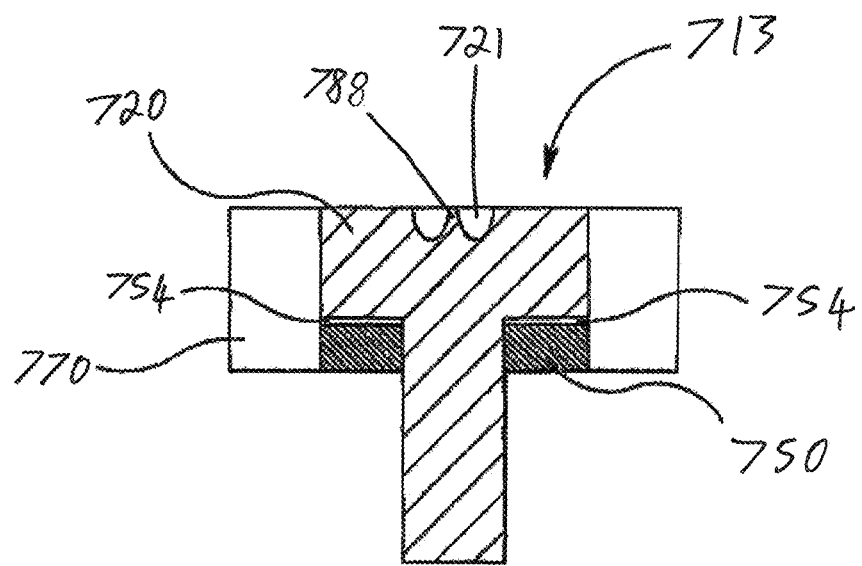
FIG. 13 is a sectioned side view of another embodiment of a die in accordance with the present invention.

FIG. 13 shows another embodiment of a die for insertion into a die holder. This embodiment is structurally and functionally similar to that of FIGS. 6 and 7, therefore only the differences will be described in detail.

Like the die 213 of FIGS. 6 and 7, the die 713 of FIG. 13 is a multi-part assembly. It has a washer 750 with radial channels 754, a die head 720, and a sleeve 770 positioned substantially circumferentially around the die head 720. The die head 720 is an example of a radially inner hub and the sleeve 770 is an example of a radially outer ring. In this embodiment the die head 720 is substantially cylindrical and the sleeve 770 is substantially annular.

It will be apparent that the sleeve 770 of FIG. 13 is significantly thicker than that of FIGS. 6 and 7. This provides the sleeve 77 with sufficient strength for it to reinforce the die head 7 against radial expansion during flow of workpiece material into the cavity 721, by providing the die 713 as a whole with greater resistance to hoop stress. In this embodiment, as with the embodiment of FIGS. 6 and 7, the sleeve 770 exhibits an interference fit with the die head. Whilst in the embodiment of FIGS. 6 and 7 the sleeve was a press fit, in this case the die 713 is assembled through shrink-fitting. The sleeve 770 is heated, causing it to expand, and is then placed around the die head 720 and allowed to cool. As the sleeve 770 cools, it contracts and applies a compressive force to the die head 720 which greatly exceeds that applied through the press-fit arrangement of FIGS. 6 and 7. The die 713 as a whole is therefore not only reinforced by the sleeve 770, but is also "pre-stressed" by it.

Figure 14:
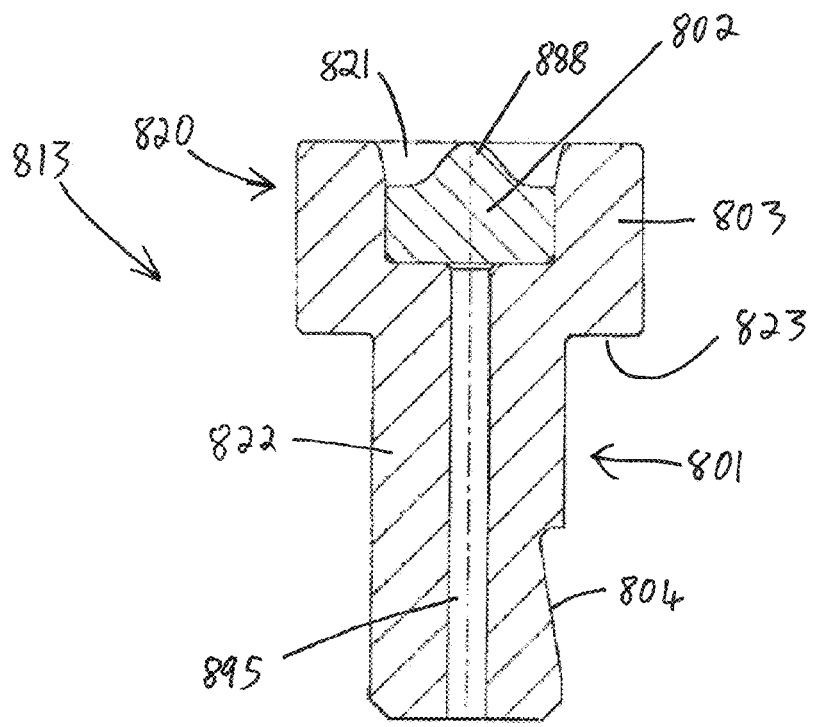
FIG. 14 is a sectioned side view of a further embodiment of a die according to the present invention.

A further potential advantage of utilising a die which is a multi-part assembly is that the materials of different components of the die can be optimised according to the requirements placed on that part. FIG. 14 shows an embodiment of a multi-part die 813 which utilises this idea. The die 813 has a main body 801, and an insert 802. The main body 801 has a stem portion 822, and a ring portion 803 which is positioned radially outwards of, and substantially circumferentially around, the insert 802. The insert 802 is another example of a radially inner hub and the ring portion 803 another example of a radially outer ring.

The stem 822 of the die 813 of this embodiment has a ramp 804 positioned to be acted on by a grub screw (such as that described in relation to the die adapter of FIGS. 10 and 11), to hold the die in place in a die adapter. In some arrangements a grub screw may be used merely to clamp against the stem of a die, retaining the die in a die holder through friction alone. In this embodiment however, tightening a grub screw against the ramp 804 cams the die downwards (from the perspective of FIG. 14), which urges the underside 823 of the die head 820 against an upper surface of a die holder (not visible) and provides a more stable and secure connection. Additionally, the grub screw and ramp form a positive mechanical interlock, rather than relying on friction alone, more effectively preventing removal of the die while the grub screw is in place.

The insert 802 of the die 813 is a tight fit inside the ring portion 803 of the main body 801, and is secured with cement (not visible). The insert 802 seals the passage 895 substantially closed. The passage 895 therefore allows a loose, damaged or missing insert 802 to be detected by monitoring the back pressure of gas in the passage in the manner described previously.

The insert 802 of the die 813 of this embodiment is provided with a pip 888. The pip 888 projects upwards (from the perspective of FIG. 14) and acts to direct the plastic flow of workpiece material into the cavity 821 during insertion of a rivet, this flow of material causing the rivet to flare outwards as described above. Workpiece material directed by the pip 888 slides down the surface of the pip and into the cavity 821. This sliding subjects the pip 888 to substantial frictional forces, meaning that the pip 888 is particularly prone to wear. It is therefore preferable for the pip 888 to be made out of a particularly hard material. The insert may be made out of 'calmax' chromium-molybdenum-vanadium alloyed steel, a tool steel, ceramic, carbide or titanium alloy, or any other suitable material.

In contrast to the pip 888, the optimum material for the main body 801 is significantly softer. Although the material of this part of the die must afford the ring portion 803 sufficient hoop strength to prevent the die 813 from bursting under the pressure of workpiece material forced into the cavity 821, it is also beneficial for the material of the main body 801 to be softer than that of the insert 802. The ring portion 803 of the main body 803, being radially outermost, can be subjected to knocks when workpieces and/or the die are manoeuvred relative to one another. Further, since the die 813 is held in place in a die holder (not visible) by the stem 822, the forces of any such knocks to the die must ultimately be withstood by the stem. The main body 802 being made of a softer material, for example high tensile steel or reduced hardness tool steel, makes the ring portion 803 and stem 822 less brittle, and thus less likely to fracture when the die is knocked. It also makes the ring portion 803 less liable to crack, which in this case actually increases the hoop strength of the die 813 in comparison to if the ring portion was also made of calmax (for example).

It is to be noted that in this embodiment, the cavity 821 is co-operatively defined by the ring portion 803 (i.e. the ring) and the insert 802 (i.e. the hub). This may be beneficial in that with the entire ring being made of a softer material, the improvements in resilience and hoop strength discussed above may be particularly large. However, in some circumstances the cavity as a whole (rather than just the pip) may be subjected to high levels of wear, in which case it may be advantageous for the cavity to be provided entirely within a hub made of harder material. For instance, it may be beneficial in some circumstances for the embodiment of FIG. 13 to be modified by making the die head (the hub) out of a harder material than the sleeve (the ring).

Figure 15:
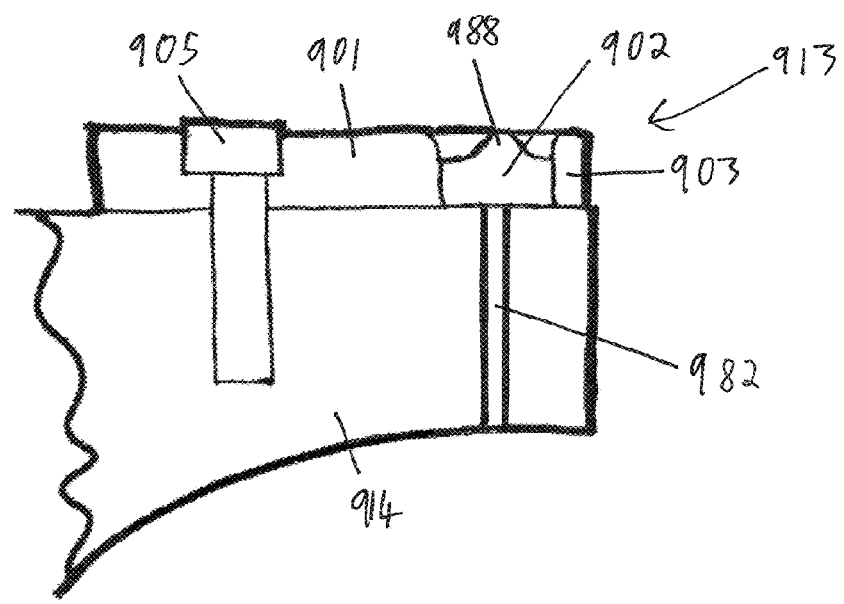
FIG. 15 is a sectioned side view of a still further embodiment of a die in accordance with the present invention, mounted on a lower arm of a C-frame.

FIG. 15 shows a modification of the die of FIG. 14. Like the die of FIG. 14, this die is a multi-part assembly comprising a radially inner hub in the form of an insert 902, received within a radially outer ring in the form of a ring portion 903 of a main body 901. The insert 902 of the die 913 of FIG. 15 and that of the die of FIG. 14 are substantially identical. In this embodiment, however, the main body 901 takes the form of a mounting plate which is securable on the lower arm 914 of a C-frame (the lower arm forming the die holder of this embodiment) using a bolt 905.

In this embodiment the insert 902 is not held within the ring portion 903 using cement, but simply exhibits an interference fit therewith. More particularly, in this embodiment the insert 902 is press-fitted into the ring portion 903. Whereas the die of FIG. 14 had a stem 822 with a passage 895, in this embodiment the die 913 has no stem and no passage. Instead, the arm 914 of the C-frame (i.e. the die holder) has a bore 982, which is an example of a gas passage. The main body 901 is a precise fit with the lower arm 914 of the C-frame, and the insert 902 is a precise fit with the ring portion 903, therefore the bore 982 is sealed completely closed by the die 913 in normal use. The gas back pressure in the bore 982, or the flow rate therethrough, can be used to monitor the condition of the die 913 in the same manner as described above.

Figure 16:
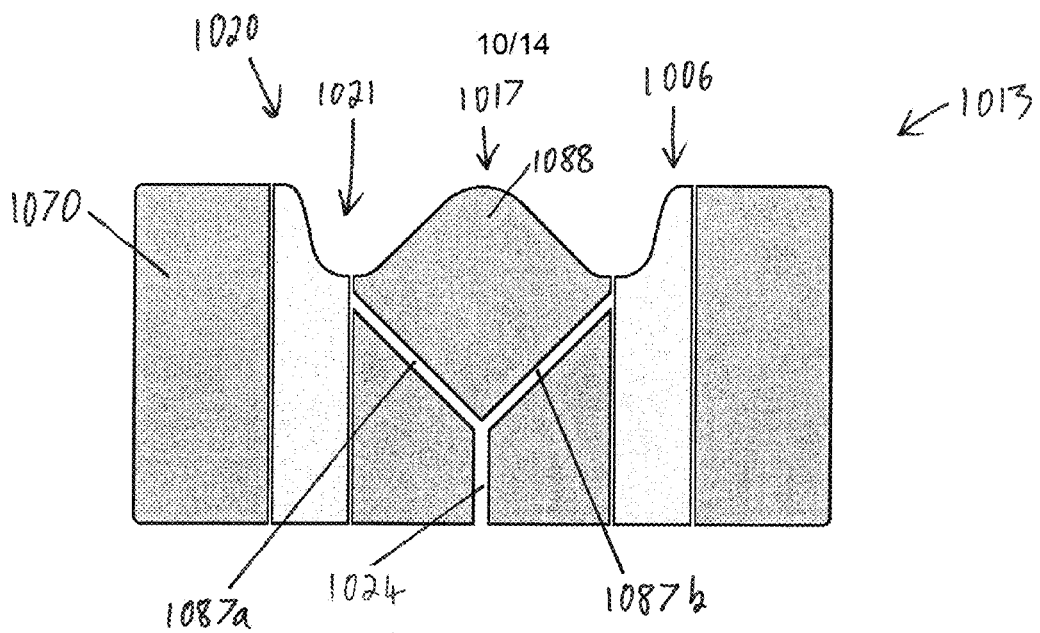
FIG. 16 is a sectioned side view of another embodiment of a die in accordance with the present invention.
Figure 17:
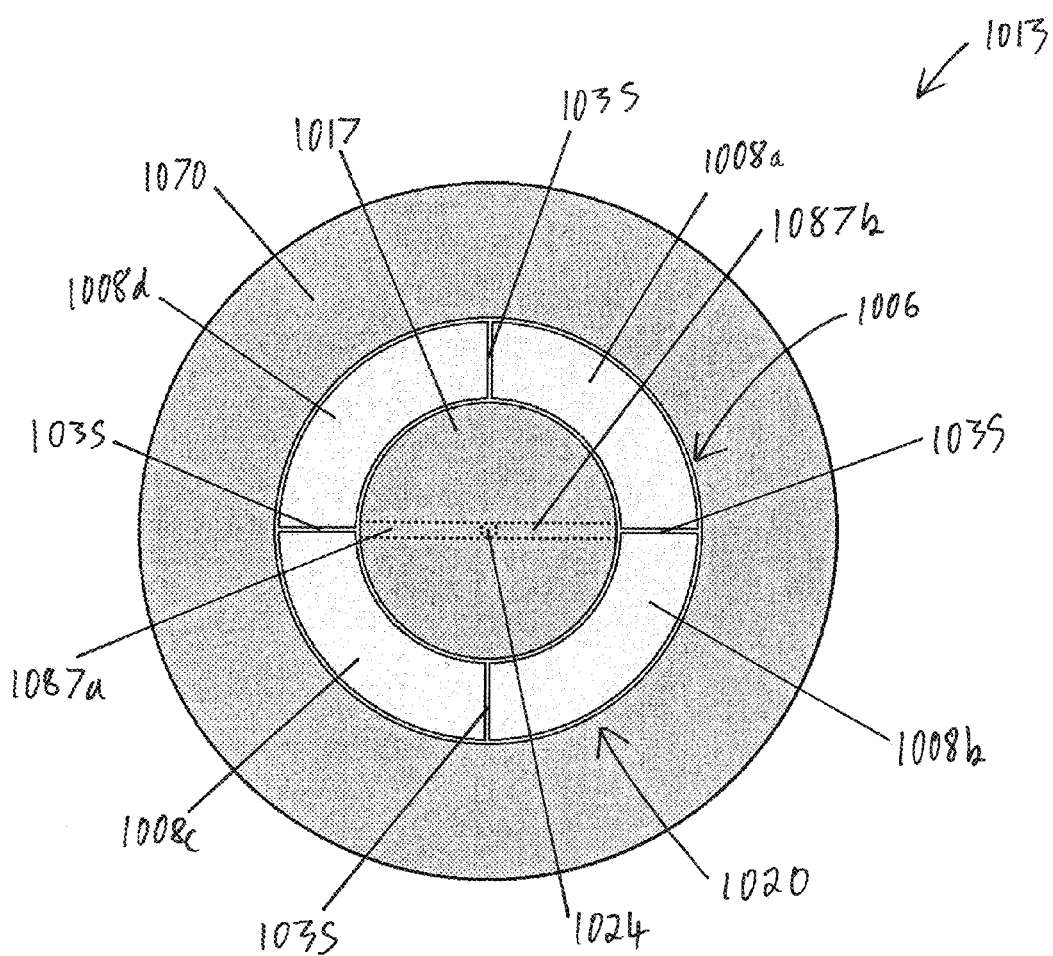
FIG. 17 is a plan view of the embodiment of FIG. 16.

FIGS. 16 and 17 show another embodiment of a die 1013 for insertion into a die holder. The die 1013 of this embodiment is configured for receipt within a die holder (not visible) of the type described in relation to FIG. 8. Like the die 713 of FIG. 13, the die 1013 of FIGS. 16 and 17 has an outer ring in the form of a sleeve 1003, and a radially inner hub in the form of a die head 1020. In this embodiment, the die head 1020 has a circumferentially segmented portion 1006 which in this case is made up of four arcuate segments 1008*a*-1008*d*. In this embodiment, the circumferentially segmented portion 1006 is positioned circumferentially around a core portion 1017 which comprises a central pip 1088. As with the sleeve 770 of the die 713 of FIG. 13, the sleeve 1070 exhibits a shrink-fit with the die head 1020, pre-stressing it. In this case, the pre-stressing of the die 1013 has the additional function of ensuring that the segments 1008*a* 1008*d* of the circumferentially segmented portion 1006 do not move relative to one another (or relative to the core portion 1017 or ring 1003) during normal use. This also seals the gaps between the components of the die, preventing flow of air therebetween when the die is functioning as intended.

With the die 1013 of this embodiment mounted in a die holder adaptor such as that described in relation to FIG. 8, die failure can be monitored in a similar manner to that discussed in relation to that figure. In addition to this functionality, the core portion 1017 has two gas bleed passages 1087a, 1087b branching from a central conduit 1024. The conduit 1024 is positioned to be in communication with a bore of the die holder (e.g. bore 382 in the die holder 381 of FIG. 8). Air from the bore can therefore travel into the gas bleed passages 1087a, 1087b through the conduit 1024. In normal use, each of the gas bleed passages 1087a, 1087b is closed at a junction 1035 between two segments 1008a-1008d of the circumferentially segmented portion 1006. More particularly, gas bleed passage 1087a is closed by the junction 1035 between segments 1008c and 1008d, and gas bleed passage 1087b is closed by the junction 1035 between segments 1008a and 1008b. Accordingly, this embodiment allows the monitoring of the relative positions of segments 1008a-1008d of the circumferentially segmented portion 1006. If damage to the die 1013 causes segments 1008a and 1008b to move apart, air may pass along gas bleed passage 1087b and out of the junction 1035 between these segments. This passage of air can be detected. Similarly, if damage to the die moves apart segments 1008c and 1008d, air can pass through gas bleed passage 1087a and out of the junction therebetween, and again this can be detected.

The geometry of a die with a circumferentially segmented portion can be selected to fit the particular application for which the die is intended. For example, in other embodiments the number of segments may be different and/or the number of bleed passages may be different. Further, in other embodiments there may be no core portion, at which point the segmented portion would also provide the pip (where present). It should also be noted that although the segments of this embodiment are substantially identical, in other embodiments this may not be the case. Further, whilst in the case the core portion provides the pip in its entirety and the cavity is defined entirely within the hub, in other embodiments the core portion may only provide part of the pip (where present), at which point the remainder of the pip would be provided by the circumferentially segmented portion, and/or the cavity may be co-operatively defined by both the hub and the ring.

Figure 18C:
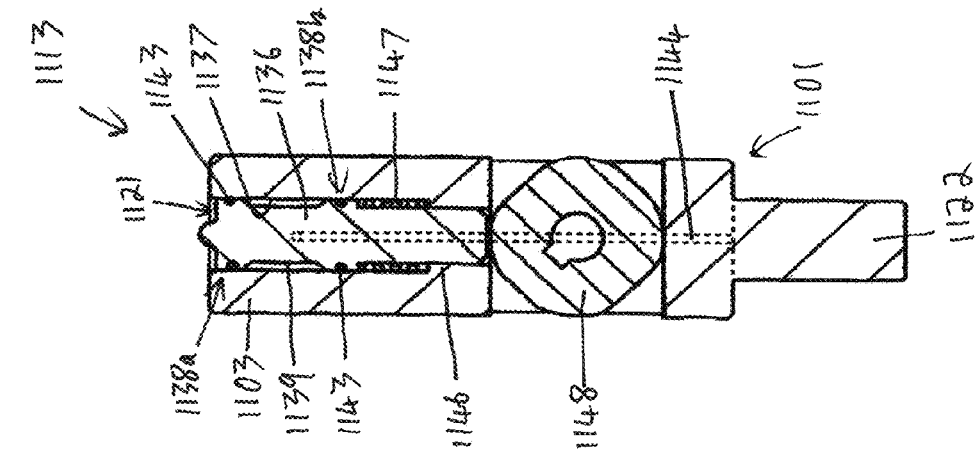
FIGS. 18A to 18C are sectioned side views of a further embodiment of a die in accordance with the present invention.
Figure 18B:
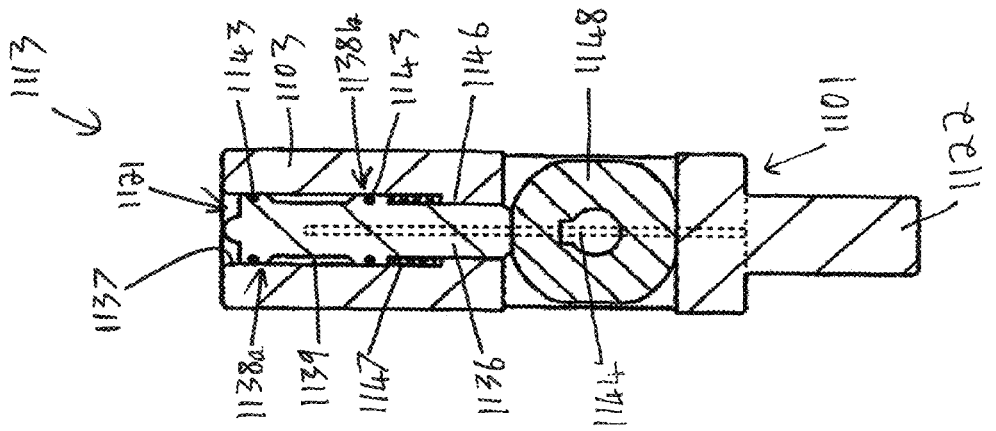
Figure 18A:
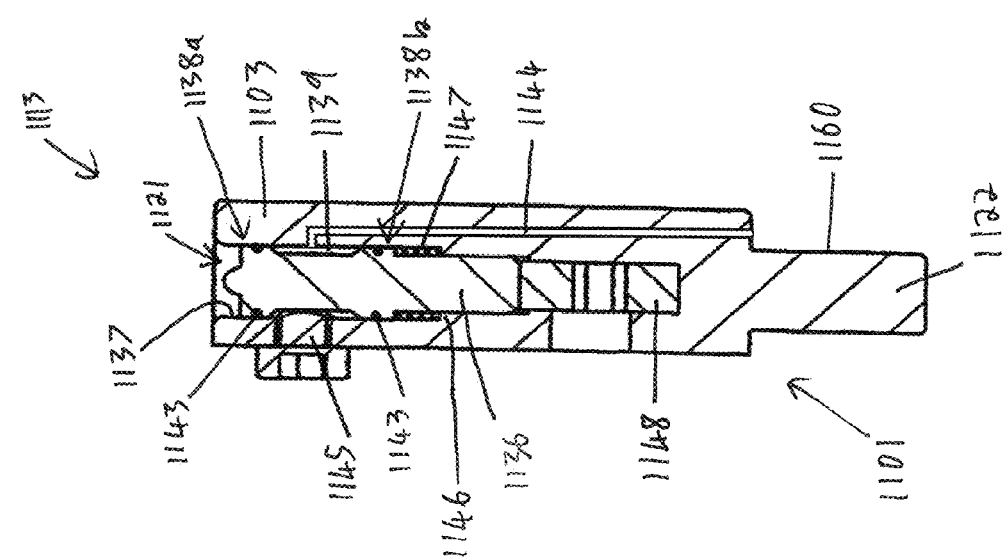

FIGS. 18A-18C show another embodiment of a die 1113 according to the invention. FIG. 18A shows the die 1113 in cross-section viewed from one side, and FIGS. 18B and 18C show the die in cross-section but rotated through 90 degrees. This die is also a multi-part assembly with a radially inner hub and a radially outer ring. Like in the embodiment of FIG. 14, the radially outer ring takes the form of a ring portion 1103 which is part of a main body 1101, the main body having a stem 1122 for receipt within a bore of a die holder (not visible). The hub of this embodiment, however, takes the form of a cam follower 1136 which is slidably received within a bore 1137 defined by the ring portion 1103. The ring portion 1103 and the follower 1136 co-operatively define an axis which is vertical from the perspective of FIGS. 18A to 18C.

The follower 1136 has a pair of shoulders 1138a, 1138b, each of which has a diameter which is slightly smaller than the inside diameter of the ring portion 1103 (i.e. the diameter of the bore 1137). The follower 1136 can therefore slide within the ring portion 1103, but cannot tilt or move laterally to any significant extent. The follower 1136 and ring portion 1103 co-operatively define an annular chamber 1139 between the two shoulders 1138a, 1138b. Each shoulder 1138a, 1138b has a seal 1143 which engages with the bore 1137 so as to prevent fluid flow between that shoulder and the bore. The chamber 1139 is therefore air-tight at its axial (i.e. top and bottom from the perspective of FIGS. 18A-18C) ends.

The stem 1122 of the main body 1101 has a flat 1160, so that with the stem 1122 received in a bore of a die holder (not visible) a clearance is provided to allow the passage of air along the stem, as explained above in relation to the embodiment of FIG. 5. As also explained with reference to FIG. 5, in other embodiments the flat 1160 may be replaced with a groove, recess, channel or the like in the surface of the stem to allow for the flow of air.

A duct 1144 is aligned with the flat 1160 so as to be in fluid communication with the clearance provided between the flat and the bore of a die holder (not visible). The duct 1144 extends up the main body, and intersects the bore 1137 at a position which allows fluid communication between the duct and the chamber 1139. The duct 1144 is therefore arranged to provide fluid communication between the chamber 1139 and the bore in the die holder (not visible).

A bolt 1145 runs radially through the ring portion 1103 of the main body 1101, and projects into the bore 1137 and into the chamber 1139. The bore 1137 of the main body 1101 also has a shoulder 1145, to which a spring 1147 (in this case a tension spring) is attached. The top end of the spring 1147 is attached to shoulder 1138b of the follower 1136. The spring 1147 acts to urge the shoulders 1145, 1138b towards one another, urging the follower 1136 axially (downwards from the perspective of FIGS. 18A to 18C) relative to the ring portion 1103.

Beneath the bore 1137 and the follower 1136, the main body 1101 has a cam 1148 mounted so that it can rotate about an axis which is perpendicular to the axis of the ring portion 1103 and follower 1136, under the action of a rotary actuator such as an electric or hydraulic motor (not visible). The cam 1148 being positioned beneath the follower 1136 limits the extent to which the follower can move downwards (from the perspective of FIGS. 18a to 18c) under the influence of the spring 1147. As will be apparent from comparing FIGS. 18b and 18c, how far down the follower 1136 is permitted to reach depends on the angular position of the cam 1148. In other words, by rotating the cam 1148 the follower 1136 can be moved axially up or down relative to the main body 1101 (in particular the ring portion 1103). The hub of this embodiment is therefore axially movable via a cam and follower linkage. The bolt 45 projecting into the chamber 1139 (i.e. projecting between the shoulders 1138a and 1138b) limits the range of motion of the follower 1136. If the follower is urged upwards (from the perspective of FIGS. 18a to 18c) relative to the ring portion 1103, for example, the lower shoulder 1138b contacts the bolt 1145 and the follower 1136 is prevented from moving any further. Similarly, if the follower 1136 moves downwards (from the perspective of FIGS. 18a to 18c) relative to the ring portion 1103, the upper shoulder 1138a contacts the bolt 1145 and the follower is prevented from moving any further.

By adjusting the position of the follower 1136 relative to the ring portion 1103, the shape of the cavity 1121 (in particular its volume) can be adjusted. Moving the follower 1136 downwards relative to the ring portion 1103 increases the volume of the cavity 1121, and moving the follower upwards reduces the volume of the cavity. Due to this adjustability, the die 1113 may be used when forming a variety of different joints (for instance joints in workpieces of a variety of thicknesses and/or material construction, and/or joints using rivets of different geometries). In contrast, SPR dies are conventionally only suited to joining a particular workpiece thickness and material composition, using a particular rivet geometry.

As explained above, the duct 1144 allows fluid communication between a gas passage in a die holder (not shown)

and the chamber 1139. The condition of the die 1113 can therefore be monitored by applying pressurised air (for example) to the chamber 1139 through that gas passage and observing (for example) the flow rate therethrough. Damage to the die (for example fracture of the ring portion 1103 or follower 1136) would allow air leakage, which could be detected.

In a modification of this embodiment, the spring 1147 may take the form of a compression spring. The spring 1147 would then urge the follower axially upwards (from the perspective of FIGS. 18A-18C), either to the point at which the spring reached its natural length or to the point at which the shoulder 1138 contacted the bolt 45. In this case the relative positions of the ring portion 1103 and follower 1136 could still be adjusted so as to adjust volume of the cavity 1121 because during riveting, workpiece material displaced during insertion of a rivet would depress the follower until its downward movement was stopped by the cam 48.

Although in this embodiment the hub (the follower) is axially movable and the ring (the ring portion of the main body) is axially fixed, in some embodiments it may be the hub that is axially fixed and the ring which is movable. In other embodiments, relative axial movement of the hub and ring may be effected by moving both the hub and the ring (for instance in opposite directions).

It is to be understood that the above cam and follower linkage is only one example of means by which a hub and ring can be moved relative to one another. For instance, in a modification of the above embodiment the cam may be replaced by a wedge-shaped ramp which is movable linearly, in a direction perpendicular to the axis of the follower and ring portion, using a linear actuator. Forward movement of the ramp (i.e. in the direction of the point of the wedge) would cam the follower upwards, and moving the ramp in the opposite direction would allow the follower to move downwards.

It should also be noted that the use of the conduit of this embodiment is merely one example of how air pressure can be used to monitor a die which has a hub and ring that are movable axially relative to one another. As another such example, the follower may be provided with a central axial passage of the type shown in FIG. 9. However, in this example only fracture of the die could be detected, whereas the above embodiment allows the fracture of either the follower or the ring portion to be detected.

Figure 19:
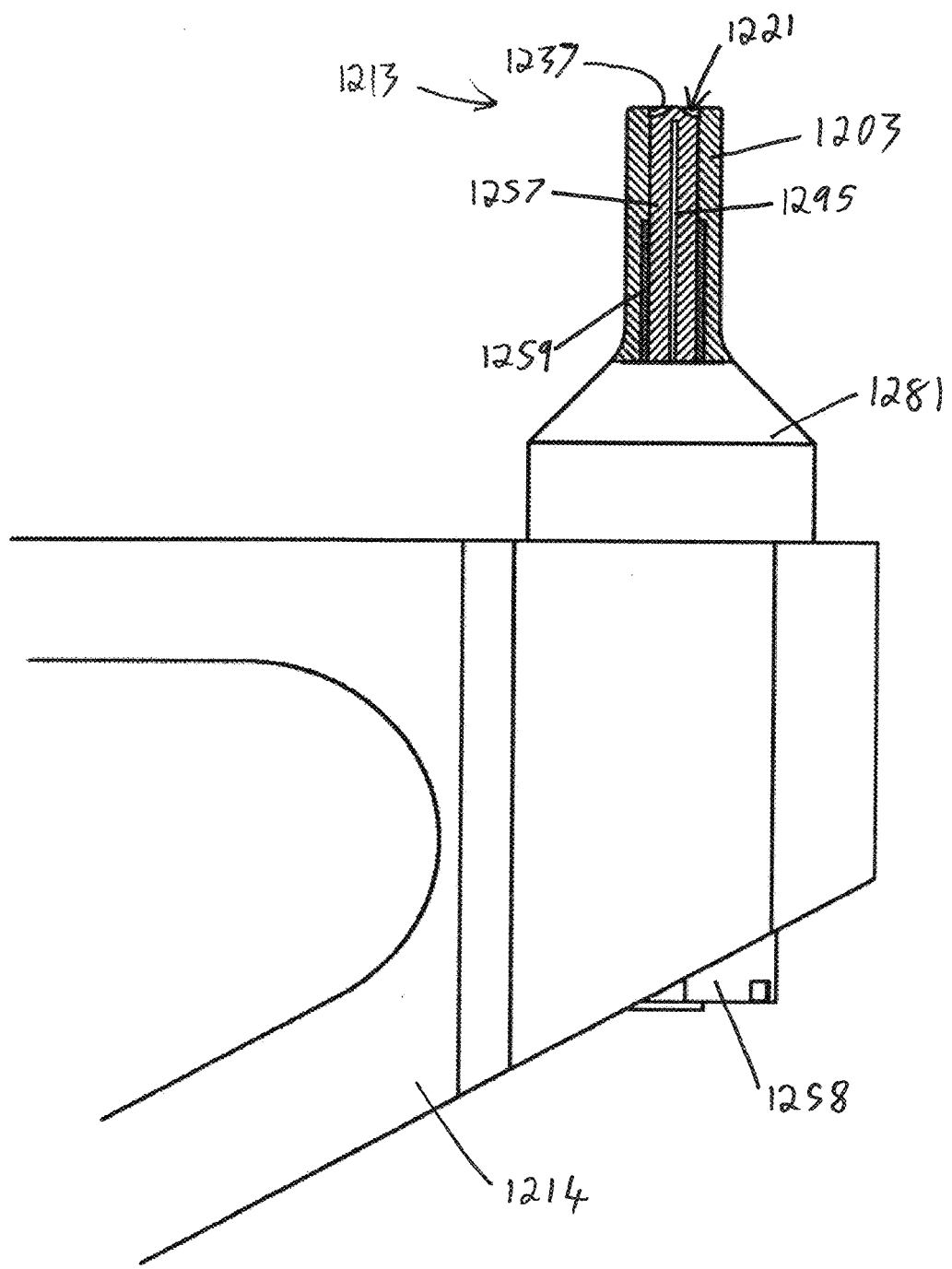
FIG. 19 is a sectioned side view of a still further embodiment of a die according to the present invention, supported on a lower arm of a C-frame.

FIG. 19 shows a die 1213 according to another embodiment of the invention. Like the embodiment of FIGS. 18A to 18C, the die 1213 of this embodiment has a ring portion 1203 defining a bore 1237, within which a hub portion is received. Again, the hub and ring define a mutual axis which is vertical from the perspective of FIG. 19. In this case, however, the hub portion takes the form of a spindle 1257 which is rotatably received within the ring portion 1203. The die holder 1281 of this embodiment supports the ring portion 1203 on the lower arm 1214 of a C-frame, but does not contact the spindle 1257 directly. The ring portion 1203 of this embodiment has a bearing assembly 1259 which supports the spindle axially (i.e. vertically from the perspective of FIG. 19), but allows the spindle to rotate within the bore 1237. In this embodiment the spindle is driven to rotate by an electric motor 1258 (of which only a small portion is visible in FIG. 19), however in other embodiments the spindle may be rotated by another form of motor such as a combustion engine, hydraulic motor or pneumatic motor. In this embodiment the spindle 1257 has a passage 1295 running in a substantially axial direction along the majority of its length. The passage 1295 is in fluid communication with a gas passage (not visible) in the die holder 1281. The condition of the die 1213, more particularly the integrity of the spindle 1257, can therefore be monitored by detecting a change in the pressure or flow rate of gas in the gas passage (not visible) of the die holder 1281. Such a change could indicate that gas has become able to escape from that gas passage through the passage 1295 in the spindle 1257, which in turn may indicate that the spindle has fractured or is no longer present within the bore 1237.

A die assembly where at least part of the die is rotatable, such as this embodiment, may be advantageous in that it can generate friction stir softening. Rotating the spindle 1257 against a workpiece supported on the die 1213 can be used to generate significant amounts of frictional heating, which can soften the workpiece material and enable it to deform to the extent required to allow a satisfactory SPR joint to be produced. Such technology may be used, for example, for workpieces with layers made of materials that are too hard or brittle for SPR at room temperature. Given the amount of friction and thermal shock that can be exerted on a die which is used in this fashion, the benefit of being able to monitor the condition of such a die may be particularly advantageous.

Although only one embodiment of such a die has been described here, it is to be understood that a die where at least a portion thereof is rotatable can take many different forms. For instance, the die may have a rotationally fixed spindle surrounded by a rotatable ring portion. As another example, a die may have a spindle and a ring portion both of which are rotatable (whether or not in the same direction, at the same rotational speed and/or at the same time during riveting). In some embodiments the entire die (whether or not the die has a hub and ring) may be rotatable. In such cases, the die holder may be rotatable so as to rotate the die.

In embodiments of the invention where the die has a rotatable portion (or is rotatable in its entirety) it may be advantageous for part of the die to be movable axially relative to the rest of the die. The part of the die which is rotatable and the part of the die which is axially movable may or may not be the same. As an example, the spindle 1257 of the embodiment of FIG. 19 may be arranged so that it can move axially (i.e. vertically from the perspective of FIG. 19) relative to the ring portion 1203. This would enable the spindle to be urged against a workpiece supported on the die 1213, increasing the friction therebetween and thereby increasing the softening effect. Similarly, the spindle 1257 could be retracted from the workpiece so as to cease the frictional heating when required. The ability of the spindle 1257 to move axially relative to the ring portion 1203 may also be advantageous in allowing the volume of a die cavity 1221 to be adjusted as described in relation to the embodiments of FIGS. 18A to 18C. As an example, if the embodiment of FIG. 19 was modified so that the spindle 1257 was movable axially relative to the ring portion 1203, during riveting the spindle could be urged upwards while being rotated by the motor 1258, thereby generating the required frictional heating, before then being retracted so as to provide a die cavity 1221 of the required volume for the particular rivet geometry and workpiece composition concerned.

Figure 20:
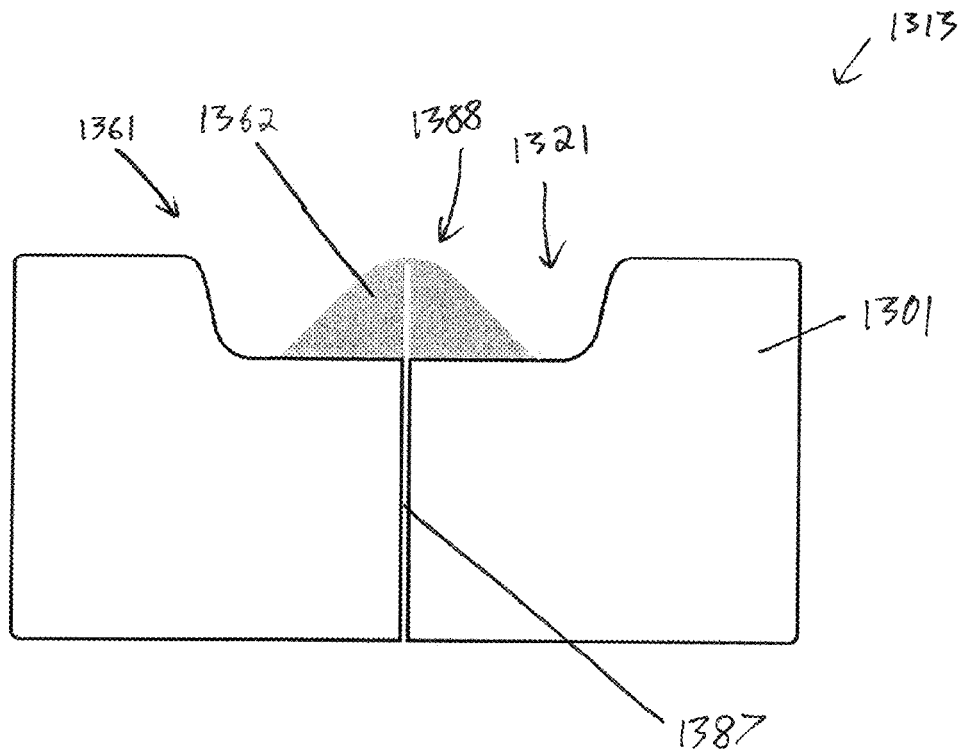
FIG. 20 is a sectioned side view of another embodiment of a die in accordance with the present invention.

A die 1313 of another embodiment to the invention is shown in FIG. 20. This die 1313 is configured for receipt within a die holder (not visible) of the type described in relation to FIG. 8. Like the dies of previous embodiments, the die 1313 of this embodiment has a die cavity 1321 with a central pip 1388 positioned therein. As with previous embodiments, the die cavity 1321 is defined by a first surface 1361 (i.e. the upper surface of the die from the perspective of FIG. 20, on which workpieces can be supported). The die 1313 of this embodiment has a bleed passage 1387 in communication with a gas passage of a die holder (for instance reference 482 in FIG. 8) at one end (a first end), in this case its lower end from the perspective of FIG. 20. The bleed passage 1387 is sealed substantially closed at the other end (i.e. its second end, positioned at its top from the perspective of FIG. 20) by the first surface 1361. In other words, the first surface 1361 takes the form of a thin layer which runs across the bleed passage 1387, substantially sealing it.

Although previous embodiments of the invention have largely been concerned with monitoring the condition of a die in terms of detecting whether or not a component thereof has fractured or is missing, a die assembly according to this embodiment can perform this function but can also allow monitoring of wear of the die (in this case the cavity 1321 in particular). Since the bleed passage 1387 terminates at the first surface 1361, if the first surface is worn (which would change the shape of the die cavity 1321 and potentially affect the quality of joints produced thereby) the passage would be exposed and air could flow therethrough. This could be detected as described previously.

In SPR, the pip is often the part of the die which is subject to most wear (this can be because the pip directs the plastic flow of workpiece material, and is therefore subjected to high frictional forces). The bleed passage 1387 of this embodiment is therefore positioned so that it is sealed by a portion of the first surface 1361 which is provided by the pip 1388. The bleed passage 1387 is therefore likely to be exposed as soon as wear has significantly affected the shape of the die. In contrast, if the bleed passage 1387 was positioned at a different location, by the time it had been exposed and the wear had been detected, the pip could have already been worn down significantly and the quality of the joints produced using the die 1313 could already have been affected for some time. In this embodiment the bleed passage 1387 is positioned substantially centrally within the die 1313 so that it terminates at the distal tip of the pip 1388. However, in other embodiments it may be positioned differently (for example it may be positioned to terminate at a different location on the pip 1388, or to terminate at a location on the first surface 1361 which is not provided by the pip).

Since the pip of a die is often the portion which is worn most quickly, as explained above, in this embodiment the pip is also made out of a portion of material which is harder (and therefore more wear resistant) than the material of the main body. This portion is referred to below as the wear resistant portion 1362 which is attached to the main body 1301. In this case, the wear resistant portion 1362 and the pip 1388 are one and the same.

Figure 21:
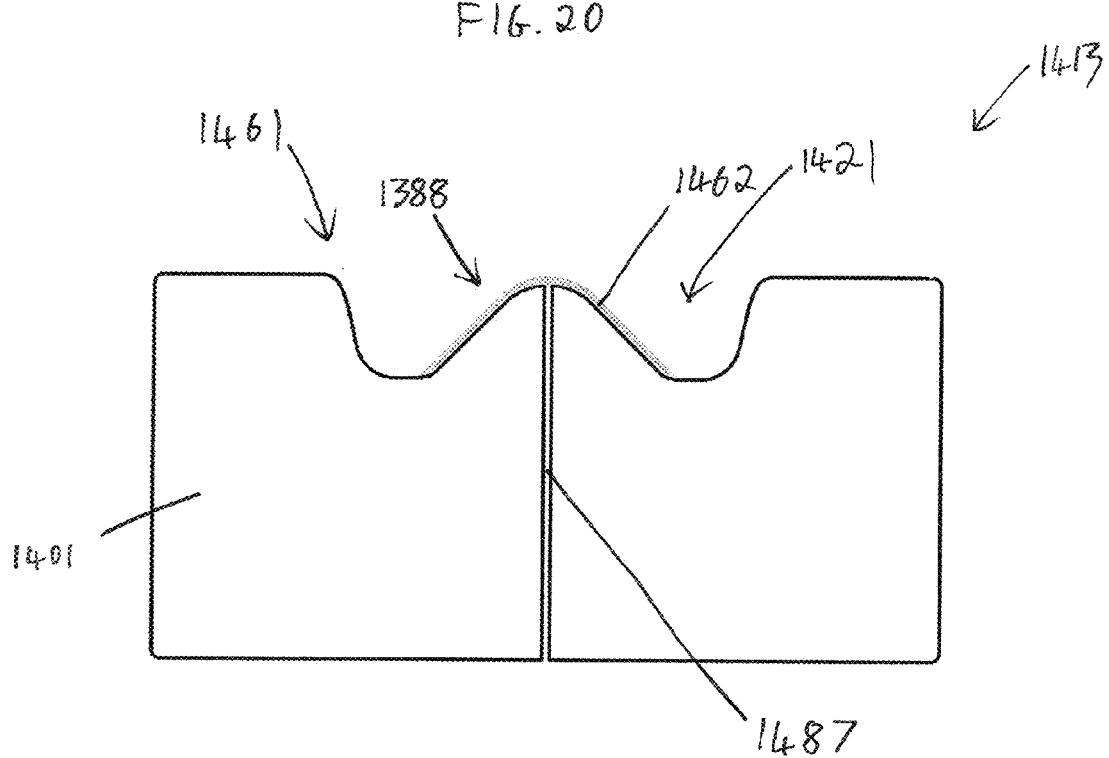
FIG. 21 is a sectioned side view of a further embodiment of a die in accordance with the present invention.

FIG. 21 shows a die 1413 according to another embodiment of the invention. The die 1413 of this embodiment is similar to the embodiment of FIG. 20, therefore only the differences will be described here. In this embodiment, the wear resistant portion 1462 forms only the part of the first surface 1461 which is provided by the pip 1388, rather than all of the pip. In other words, the pip 1388 is formed largely by the main body 1401, rather than the wear resistant portion 1462. It is also noteworthy that in the embodiment of FIG. 21, the bleed passage 1487 is formed entirely within the main body. In contrast, in the embodiment of FIG. 20 the bleed passage was formed partially in the wear resistant portion. In other words, in the embodiment of FIG. 20 the second end of the bleed passage was defined in the wear resistant portion whereas in the embodiment of FIG. 21 the second end is defined in the main body.

The bleed passage 1487 being defined entirely within the main body 1401 may be beneficial in terms of ease with which the die 1413 can be manufactured. For instance, the main body can be produced as a solid block before drilling a hole therein to form the bleed passage 1487 and then attaching the wear resistant portion 1462. In contrast, forming the bleed passage in the die of FIG. 20 using a drill would be more difficult, since it would require the drill to be capable of cutting through two different materials (which would prevent the geometry and material of the drill bit used to be optimised for any particular material). This process would also require extremely precise control of the depth of drilling, so as to prevent the bleed passage from penetrating through the first surface.

Whilst FIGS. 20 and 21 show two particular arrangements where the die has a bleed passage sealed substantially closed by the first surface, it is to be understood that other embodiments may take any other suitable forms. For instance, the portion of the first surface which seals the bleed passage may be defined by a different portion of the pip, or may not be defined by the pip at all. Further, although in the above embodiments the wear resistant portion is a part of (or one and the same as) the pip, in other embodiments the wear resistant portion (where present) may be positioned in any other suitable location. For instance, the wear resistant portion may define the entire surface of the cavity (or indeed the entirety of the first surface), or the wear resistant portion may be positioned circumferentially around the pip. Furthermore, it is to be understood that in other embodiments the die may have more than one bleed passage.

As outlined above, using machining operations to manufacture a die with a bleed passage sealed substantially closed by the first surface may be relatively difficult and/or time consuming. This is especially true when the die has two portions made of different materials. In some circumstances it may therefore be advantageously quick and/or inexpensive to manufacture such a die using additive manufacturing. Additive manufacturing, sometimes referred to as "3D printing", refers to manufacturing processes where the geometry of a three-dimensional object is created (at least partially) by the addition of material, rather than conventional processes such as machining in which the geometry of a product is formed by removing material. FIGS. 22A to 22E show stages in the additive manufacture, according to another embodiment of the invention, of the die of FIG. 20. It is to be understood, however, that other dies which have a bleed passage sealed substantially closed by the first surface and which have a wear-resistant portion, such as the embodiment of FIG. 21, may also be produced using a method according to the invention. The method of this embodiment uses extrusion deposition, where articles are built up through the depositing of small beads of molten material which solidify and fuse together.

Figure 22A:
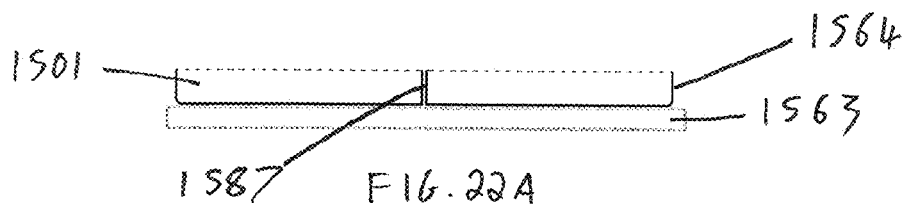
FIGS. 22A to 22E are sectioned side views of stages in the manufacture of the embodiment of FIG. 20.
Figure 22B:
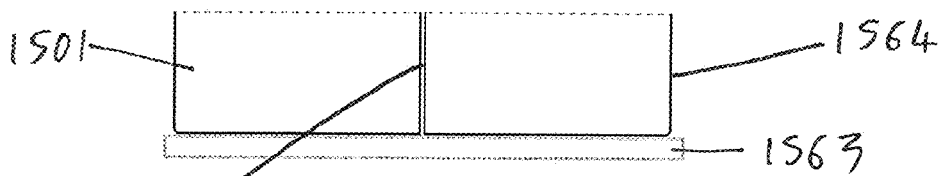

Referring first to FIG. 22A, during the manufacturing process the die is built up in successive layers on a support platen 1563. A first layer is formed by applying beads of molten material onto the platen 1563 in a planar array. In this case the material used is Ti-6A1-4V (Grade 5) titanium (referred to below simply as 'titanium'). However, in other embodiments any other suitable material may be used, for instance a different titanium alloy or a low alloy steel. The molten beads of the first layer merge with one another before hardening, thereby forming a single continuous layer. A second array of beads is then applied on top of the first layer. The beads of this layer not only fuse with one another but also with the layer beneath, thereby forming a solid object. Successive layers are then formed, increasing the height (from the perspective of FIGS. 22A to 22E) of the object and building up the main body 1501 of the die as shown in FIGS. 22A and 22B. Throughout these stages each layer is substantially identical, in this case being circular in shape with a gap in the form of a small central aperture. The layers are positioned so that their apertures are aligned and co-operatively form the bleed passage 1587. The outer peripheries of each layer co-operatively form the outer periphery 1564 of the main body 1501.

Figure 22C:
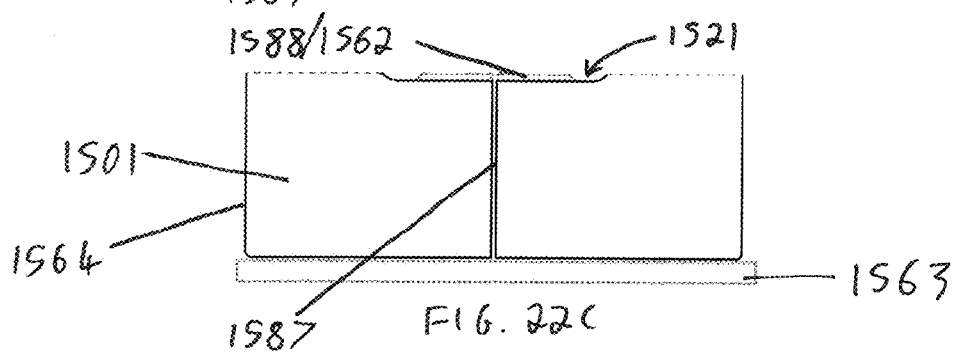
Figure 22D:
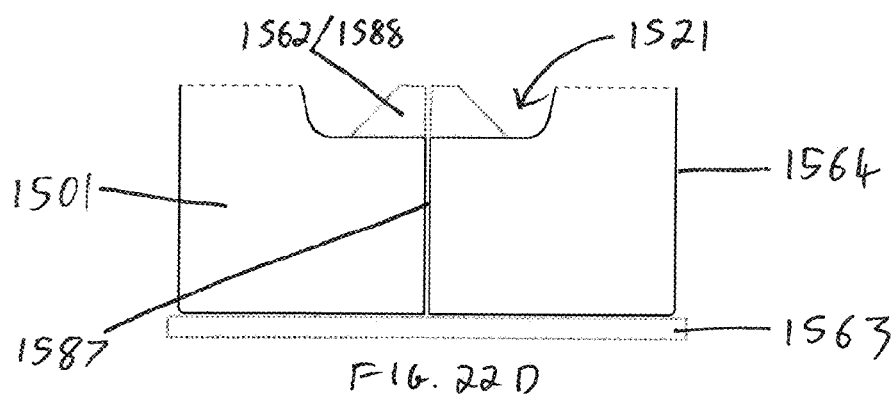

As shown in FIG. 22C, once the axial height of the combined layers (i.e. the vertical height, from the perspective of FIGS. 22A to 22E, of the portion of the main body 1501 produced thus far) has reached the required height, the bottom of the cavity 1521 has been reached. At this point, the shape of the layers deposited so as to produce the main body 1501 changes. Subsequent layers are annular in shape, with their outer peripheries continuing to contribute to the outer periphery of the main body, and their inner diameters forming the outer periphery of the cavity 1521.

At this point in production of the die 1513 the wear resistant portion 1562 (i.e. the pip 1588) begins to be built up as well. The wear resistant portion 1562 is made of a harder material than that of the main body 1501. In this case the wear resistant portion 1562 is made of H13 tool steel (referred to below as 'H13'), however in other embodiments it may be made of any other suitable material, for instance one of Erasteel's ASP® tool steels. After each annular layer of titanium is applied so as to form part of the main body, a layer of H13 is applied. Accordingly, from the point shown in FIG. 22C the main body 1501 and the pip 1588 (i.e. the wear resistant portion 1562) are built up in parallel. The first layer of H13 is applied directly to the layer of titanium of the main body beneath. Subsequent layers of H13 are then built up on top of this first layer of H13. These layers of H13 are also circular in shape with a central aperture. The outer peripheries of these layers of H13 cooperatively form the sides of the pip 1588, and the apertures therein are aligned with one another (and with the apertures in the layers of titanium) so as to form the remainder of the bleed passage 1587. As will be apparent from FIGS. 22C to 22E, the inner diameters of the layers of titanium progressively increase slightly so as to give the periphery of the cavity 1521 a slightly conical shape. Similarly, the outer diameters of the layers of H13 progressively decrease so as to give the pip 1588 a tapered shape.

Figure 22E:
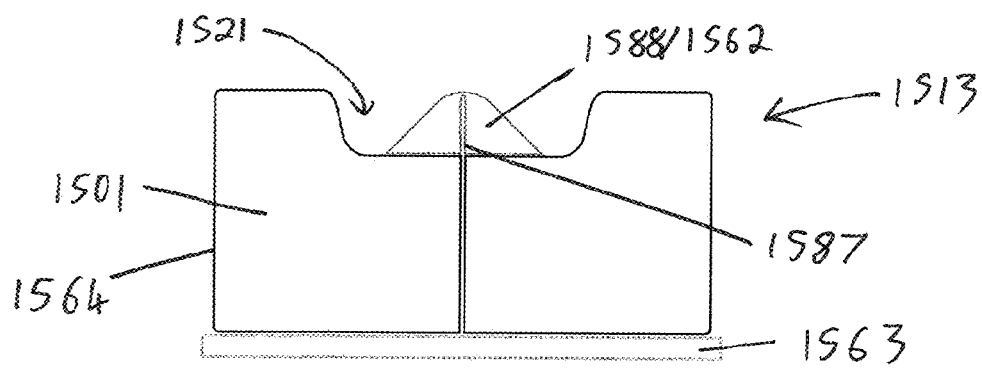

Once sufficient layers have been deposited, the die 1513 has reached the required axial height and its shape is complete, as shown in FIG. 22E. As shown in this figure, the final few layers of H13 do not have an aperture, sealing the end of the bleed passage 1587 with a thin layer of material as described above. Once all necessary layers have been applied, the die 1513 can be removed from the support platen 1563 and installed in a die holder (not shown).

In a modification of the above embodiment, successive layers are produced through granular material binding, where an article is built up by selectively joining particles in a granular bed. In this modification, the support platen first supports a thin layer of a first material (Ti-6A1-4V titanium in this case, as discussed above) in granular form. Some of the grains of this layer are then joined to one another (for instance fusing them by melting or sintering them with a laser or an electron beam, or adhering them to one another using a binder) so as to form a circular sheet with central aperture, thereby producing the first layer. The remaining grains remain loose but are not removed. Another layer of granular titanium is applied on top of the first layer and the remaining loose material. Grains within the newly-applied layer of material are then joined to one another, and to the first layer, in the same fashion. Subsequent layers are built up similarly, thereby forming the main body. Whilst in the embodiment of FIGS. 22A to 22E the main body and the wear resistant portion were produced simultaneously, in this case the main body is produced first. Once the main body has been fully formed, it is removed from the remaining granular titanium (which can then be recycled). The cavity is then filled with a thin layer of a second, harder material (in this case H13, as discussed above), the grains of which are then selectively joined to one another and to the main body (in the same manner as the grains of titanium, or in any other suitable manner). Subsequent layers of H13 are then applied to the cavity and subsequent layers of the pip are formed until the die is complete.

It is to be understood that although the embodiment of FIGS. 22A to 22E the portion 1562 of H13 is built up at the same time as part of the main body 1501, in other embodiments this may not be the case. For example, the main body may be completed before then applying layers of H13, as described in relation to the above modification. Similarly, although in the above methods layers are built up in the axial direction starting from the end opposite to the cavity, in other embodiments layers may be built up in any other suitable manner. For instance, layers may be built up in the axial direction starting at the end with the cavity (at which point some of the layers of the main body would be deposited on the wear resistant portion, rather than vice versa). As another example, the layers of the two different materials may be built up side-on from the perspective of FIGS. 22A to 22E. The die could be produced in the orientation shown in FIGS. 22A to 22E (i.e. with the axial direction aligned vertically, however most 3D printers are configured to build up layers vertically. It is therefore likely that in this example the die would instead be built up vertically, with its axis aligned horizontally (at which point the neither the main body nor the wear resistant portion would be built up on the other). In the case of the layers of titanium deposited so as to form the middle of the die, i.e. at a point half way through the production of the die, each layer would comprise two separate sub-layers, with a space in the form of a gap positioned therebetween (the gap forming part of the bleed passage).

Whilst it is envisioned that if a die with a main body and wear resistant portion is produced through granular material binding the main body and the wear resistant portion will usually be produced separately, this should not be construed as limiting. In some embodiments the two components may be produced simultaneously by selectively applying granular layers of the two different materials at the locations at which layers of the respective materials are required (for instance a layer of granular material may include a portion of harder material from which a layer of the pip can be formed, with a portion of softer material surrounding it from which a layer of the main body can be formed).

Furthermore, although in the above embodiment the die is formed in its entirety from layers of material and the finished die is removed from the support platen, in other embodiments the support platen may be an integral part of the finished die. For instance, referring to the die of FIG. 21, the support platen may take the form of a cylinder with a central passage which extends up to the bottom of the cavity. The remainder of the main body, and the wear resistant portion, could then be built up on top of the support platen and be permanently adhered thereto.

Initial tests conducted by the applicant have established that being able to detect a loose or broken die, and take suitable remedial action (i.e. tightening, re-fitting or re-sealing the die), has prolonged the life expectancy of the die considerably and in excess of expectations.

In all embodiments described above the pressure sensor or flow meter sensor may be arranged in line with the hose 42, 542 upstream of the gas passage (or passages) in the die holder or may be located downstream of the gas passage(s). It the latter case there may be an outlet port provide in the gas passage to which the sensor is connected via a flexible conduit if necessary.

In an alternative arrangement the gas pressure applied is a negative pressure or suction e.g. by applying a vacuum. In the event of a leak between the die and the die holder, the magnitude of the negative pressure decreases and the flow rate increases. An appropriate sensor may sense either of these.

In some embodiments, the pressure or flow rate of the gas in the gas passage is detected between the production of rivet joints (i.e. between each rivet insertion) or between the production of groups of joints (for instance detecting the pressure every second joint or every 5 joints). For instance, a rivet setting tool may perform riveting cycles, each cycle involving inserting the number of rivets required by a particular workpiece, and the pressure or flow rate may be detected in between cycles.

In some embodiments, however, the pressure or flow rate is detected during insertion of a rivet (for instance at one or more particular points during insertion of each rivet). This allows the condition of the die to be monitored in real time, which, in turn, may enable action to be taken swiftly after a problem with the die develops. This can improve the chances of identifying defective joints produced using a failed die, minimising the risk of defective products being sold.

The time during which the shank is flaring outwards in the die is often the time during rivet insertion where the stresses placed upon the die are the greatest. Accordingly, to improve the chances of die failure being detected during formation of the particular joint at which failure occurs (rather than during formation of a subsequent joint), the pressure or flow rate may be detected at a point during insertion of that rivet which is during or after this time in which the rivet shank is flaring outwards in the die. For instance, the flow rate or pressure may be detected, during insertion of the rivet, immediately after the shank of that rivet has flared outwards in the die. In contrast, if the pressure or flow rate was detected while a rivet was being inserted but before flaring of its shank, the die may fail during insertion of that rivet while the shank is flaring outwards in the die, and this would not be detected until the insertion of a subsequent rivet, (at which point the first joint may have left the riveting area and introduced a defect in a finished product).

As discussed above, detecting the condition of the die can minimise the number of joints produced by a failed (e.g. broken or loose) die. Regardless of when the pressure or flow rate in the gas passage is detected, in some embodiments it is beneficial to trigger an alert condition if the pressure or flow rate detected is within a predetermined range. For instance, the flow rate in a gas passage with a die in good condition may be zero, at which point the predetermined range would be any non-zero flow rate. As another example, the expected pressure in a gas passage when a die is in good condition may be between 120 kPa and 130 kPa, at which point the predetermined range would be a pressure below 120 kPa and/or a pressure above 130 kPa (a particularly high pressure may indicate a problem with a sensor or with the supply of compressed air, rather than die failure, but it may nonetheless be beneficial to trigger an alert condition if such an occurrence is suspected).

Triggering an alert condition in this manner can enable swift action to be taken in the event of die failure. For instance, triggering the alert condition may include discontinuing use of the die assembly. This would avoid any further joints being produced using the failed die (if indeed the pressure or flow rate is outside the threshold due to die failure, rather than any other factor). After discontinuing use of the die assembly, the die or die holder may be replaced or repaired, may be returned to service after inspection (for instance in the event of a false alarm), or any other suitable action may be performed.

Although in many circumstances it may be beneficial to cease usage of the die assembly after a fault has been detected, so as to minimise the number of joints produced after die failure, in other circumstances it may be beneficial for production to continue after entering the alert condition. For instance, in facilities where throughput of riveted workpieces is paramount, it may be more economical to continue production, at least in the short term.

In such circumstances it may be better to continue production during the alert condition, in case the alert condition is a result of a false alarm (for instance due to a fault with the sensor which detects the pressure or flow rate). Not discontinuing use of the die assembly when the alert condition is triggered may also be beneficial in situations where satisfactory joints can sometimes be produced using a failed die. In such circumstances rather than ceasing to produce joints, production may continue and the joints produced by the broken die may be subjected to particularly thorough quality control inspection. It will be appreciated that numerous modifications to the above described design may be made without departing from the scope of the invention as defined in the appended claims. For example, the shape of the die may take any suitable form. The leak paths afforded by the channels in the embodiments described above may be provided by any suitable form of grooves in the relevant surfaces of the washer or die, including recesses or the like. Moreover, particular shape of the adapter and the passages and bore may take any suitable form. Furthermore, the die cavity may take any appropriate form including that suitable for clinching.

Although particular features have been described in relation to particular embodiments, this is for illustrative purposes only and should not be construed as limiting. As an example, the embodiments of FIGS. 6, 8, 12, 20 and 21 may all be considered to have a radially inner hub surrounded by a radially outer ring, even though this is not explicitly stated. Further, optional or preferred features disclosed herein may be used in any suitable combination. Where appropriate, features described in relation to one embodiment, aspect of the invention, or arrangement or method may also be used in relation to a different embodiment, aspect of the invention, or arrangement or method.

As disclosed herein are arrangements and methods according to the following numbered paragraphs:

1. A method for detecting the condition of a die for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change a condition of the die.

2. A method according to paragraph 1, wherein the die comprises a head in which the die cavity is defined and a die stem extending from the head in a direction away from the cavity, further comprising supporting the die stem in a bore in the die holder and applying the gas at a second end of the at least one gas passage.

3. A method according to paragraph 1 or 2, wherein there is provide a further at least one gas passage defined in the die.

4. A method according to any one of paragraphs 1 to 3, further comprising using an air catch sensor to detect the change in pressure of the gas.

5. A method according to any one of paragraphs 1 to 4, further comprising directing the gas to the at least one gas passage via a conduit by connecting an outlet of the conduit to the at least one gas passage and connecting an inlet of the conduit to a source of pressurised gas.

6. A method according to paragraph 5, further comprising connecting a sensor to the inlet of the conduit for detecting the change in at least one of the gas pressure or the flow rate.

7. A method according to any one of paragraphs 1 to 6, wherein the die is a riveting die for upsetting a rivet inserted into the material.

8. A method according to any one of paragraphs 1 to 7, wherein the gas is applied to the at least one gas passage with the die in-situ in apparatus for deforming material.

9. A method according to any one of paragraphs 1 to 8, wherein the at least one gas passage has a first portion defined by the die holder and a second portion defined between the die and the die holder, the first end being defined at the end of the second portion.

10. A method for detecting a loose die, the die being of the kind for deforming material, the die having a first surface defining a die cavity in which material is to be deformed, the method comprising supporting the die in a die holder such that the die is operational with the die cavity being exposed for receipt of material and such that at least one gas passage is defined at least partially by the die holder, the at least one gas passage extending to a first end located between the die and the die holder, the first end being sealed substantially closed by at least a portion of the die, applying a gas at a pressure and flow rate to the at least one gas passage, detecting a change in at least one of the pressure or flow rate of the gas in the at least one gas passage and determining from the detected change whether the die is loose.

11. A die assembly comprising a die having a first surface defining a die cavity in which material is to be deformed, a die holder in which the die is supported such that the die is operational with the die cavity being exposed for receipt of material, at least one gas passage is defined at least partially by the die holder, the at least one gas passage extending to a first end located between the die and the die holder, the first end being sealed substantially closed by at least a portion of the die, the conduit having an outlet in fluid communication with the at least one gas passage and an inlet connectable to a source of pressurised gas, and a sensor for detecting the pressure or flow rate of the gas in the at least one gas passage.

12. A die assembly according to paragraph 11, wherein the die holder comprises a die adapter disposed between the die and a support member.

13. A die assembly according to paragraph 11 or 12, wherein the die holder is defined by part of a support frame that supports the die.

14. A die assembly according to paragraph 13, wherein the support member is part of a support frame.

15. A die assembly according to paragraph 12, wherein the die adapter comprises a body having a first end in which the die is supported and a second end, at least part of the at least one gas passage extending between the first and second ends.

16. A die assembly according to paragraph 15, wherein the die comprises a head in which the die cavity is defined and a stem extending from the head in a direction away from the die cavity, the stem of the die being received in a first bore in the first end of the die adapter body.

17. A die assembly according to paragraph 16, wherein a first portion of the at least one gas passage is defined between the stem of the die and the first bore and a second portion of the at least one gas passage extends between the outlet of the conduit and the first portion.

18. A die assembly according to paragraph 17, wherein the second portion of the at least one gas passage is in the form of a second bore.

19. A die assembly according to paragraph 18, wherein the first and second bores are substantially cylindrical with the first bore having diameter that is larger than that of the second bore.

20. A die assembly according to any one of paragraphs 15 to 19, wherein the body of the die adapter has an outwardly extending flange that is seated on the support member.

21. A die assembly according to any one paragraphs 17 to 20, wherein the second portion of the at least one gas passage extends from the second end of the die adapter body to the first portion of the at least one gas passage.

22. A die assembly according to paragraph 21, wherein the second portion of the at least one gas passage extends from the flange to the first portion.

23. A die assembly according to paragraph 21, wherein the second portion comprises a first part that extends from the second end of the die adapter to the first portion of the at least one gas passage and a second part that extends from the flange to the first portion.

24. A die assembly according to any one of paragraphs 16 to 23, further comprising a washer disposed between the die head and the die holder.

25. A die assembly according to paragraph 24, wherein the die head defines the second surface, the washer being disposed between the second surface and the die holder.

26. A die assembly according to paragraph 25, wherein the second surface is immediately adjacent to the die stem.

27. A die assembly according to paragraph 25 or 26, wherein the washer has a first surface that faces the second surface of die head and an opposed second surface that faces the die holder.

28. A die assembly according to paragraph 27, wherein one or both of the first and second surfaces of the washer defines at least one gas path which forms part of the at least one gas passage.

29. A die assembly according to paragraph 28, wherein the at least one gas path is in the form of a groove defined in the surface or surfaces.

30. A die assembly according to paragraph 29, wherein the washer has inner and outer peripheral surfaces that extend between the first and second surfaces of the washer and at least one gas path that extends in a direction from the inner peripheral surface towards the outer peripheral surface.

31. A die assembly according to paragraph 30, wherein the at least one gas path extends in a substantially radial direction.

32. A die assembly according to paragraph 31, wherein the at least one gas path comprises at least one first gas path and a second gas path, the at least one gas path extends between the inner peripheral surface and the second gas path comprises a substantially annular gas path defined towards the outer peripheral surface.

33. A die assembly according to any one of paragraphs 25, 26 or 27, where the second surface of the die head defines at least one gas path that extends from a position adjacent to the stem to an outer periphery of second surface.

34. A die assembly according to paragraph 33, wherein the at least one gas path comprises a groove defined in the second surface.

35. A die assembly according to any one of paragraphs 16 to 34, wherein the at least one gas passage is defined at least in part by a clearance between the stem of the die and a wall defining the first bore, the clearance extending along the length of the stem.

36. A die assembly according to paragraph 35, wherein the clearance provided by a flat defined along the length of the stem of the die.

37. A die assembly according to any one of paragraphs 24 to 32, 35 or 36, wherein a sleeve is provided over the outer periphery of the washer and the die head, the sleeve being deformable outwardly.

38. A die assembly according to any one of paragraphs 11 to 37, wherein the sensor is connected to the inlet of the conduit.

39. A die assembly according to any one of paragraphs 11 to 38, wherein the die is a riveting die in which a rivet for insertion into the material is upset.

40. A die assembly according to any one of paragraphs 11 to 39, in combination with a frame for supporting a setting tool over the die assembly, wherein the die holder is provided by at least part of the frame.

41. A die assembly and frame combination according to paragraph 40, wherein the frame is a C-frame having first and second arms, the first arm being disposed over the second arm in a spaced apart relationship, the first arm for supporting a setting tool and a second arm defining the die holder.

42. A die assembly according to any one of paragraphs 11 to 15, wherein the die comprises a stem and a separable collar, the die cavity being defined between the stem and collar, at least one gas bleed passage being defined in the stem.

43. A die assembly according to paragraph 42, wherein the stem has a flange on which the collar is supported and the at least one gas bleed passage is defined in the flange.

44. A method for manufacturing a riveted joint by inserting a rivet into material using a die assembly according to any one of paragraphs 11 to 43.

What is claimed is:

1. A die assembly comprising a die with a die head having a surface defining a die cavity in which material is to be deformed, the die including a stem which extends from an opposite side of the die from the die cavity; the die assembly further comprising:
    a washer which extends around the stem and a ring which extends around both the die head and the washer;
    a die holder which receives the stem and supports the die such that the die is operational with the die cavity being exposed for receipt of material;
    at least one gas passage defined between the die head and the washer, the at least one gas passage being sealed substantially closed by the ring, the at least one gas passage extending from the die into the die holder;
    a conduit having an outlet in fluid communication with the at least one gas passage and an inlet connectable to a source of pressurised gas; and
    a sensor for detecting the pressure or flow rate of the gas in the at least one gas passage.

2. A die assembly according to claim 1, wherein the ring is configured to provide reinforcement against radial expansion of the die.

3. A die assembly according to claim 2, wherein the interference fit is achieved by shrink-fitting the ring onto the die head.

4. A die assembly according to claim 3, wherein the cavity is co-operatively defined by the ring and the insert.

5. A die assembly according to claim 1, wherein the ring and die head exhibit an interference fit.

6. A die assembly according to claim 1, wherein the die head is pre-stressed by the ring.

7. A die assembly according to claim 1, wherein the washer has radial channels, the radial channels extending between the stem and the ring.

8. A method of manufacturing a die for a die assembly using additive manufacturing, the method comprising:
    providing a die holder in which the die is supported such that the die is operational with the die cavity being exposed for the receipt of material;
    providing at least one gas passage is define at least partially by the die holder, the at least one gas passage extending to a first end located between the die and the die holder, the first end being sealed substantially closed by at least a portion of the die;
    providing a conduit having an outlet in fluid communication with the at least one gas passage and an inlet connectable to a source of pressurised gas;
    providing a sensor for detecting the pressure or flow rate of the gas in the at least one gas passage;
    building up a main body of the die by depositing successive layers of a first material on a support platen;
    providing gaps in at least some of said layers so as to provide at least a portion of said at least one gas bleed passage; and
    building up an wear resistant portion by depositing successive layers of a second material, at least the portion of the part of the first surface which closes the gas bleed passage being defined on the wear resistant portion, the second material being harder than the first material,
    wherein the at least one gas bleed passage which extends from a first end in communication with the at least one gas passage to a second end, wherein the second end is sealed substantially closed by a portion of the first surface which defines a central pip of the die that is harder than at least part of the remainder of the first surface.

9. A method according to claim 8 wherein the layers of the second material are deposited on the main body.

10. A method according to claim 8 wherein the layers of the first and/or second material are each formed by depositing an array of molten beads of said material.

11. A method according to claim 8 wherein the layers of the first and/or second material are each formed by fusing or binding together portions of a granular bed of said material.

12. A method for manufacturing a riveted joint by inserting a rivet into material, the method comprising:
    providing a die assembly comprising a die with a die head having a surface defining a die cavity in which material is to be deformed, the die including a stem which extends from an opposite side of the die from the die cavity, the die assembly further comprising a washer which extends around the stem and a ring which extends around both the die head and the washer, a die holder which receives the stem and supports the die such that the die is operational with the die cavity being exposed for receipt of material, at least one gas passage defined between the die head and the washer, the at least one gas passage being sealed substantially closed by the ring;

supplying pressurised gas from a source to an inlet of a conduit having an outlet in fluid communication with the at least one gas passage;

driving the rivet into the material and towards the die such that a shank of the rivet pierces the top sheet and then flares outwardly in the die such that the material forms an annulus in the die cavity that encapsulates the shank; and detecting the pressure or flow rate of the gas in the at least one gas passage using a sensor.

13. A method according to claim 12 wherein the pressure or flow rate of the gas in the at least one gas passage is detected whilst the rivet is being driven into the material.

14. A method according to claim 13 wherein the pressure or flow rate of the gas in the at least one gas passage is detected at a point during the driving of the rivet which is during or after the time in which the shank of said rivet is flaring outwardly in the die.

15. A method according to claim 12 further comprising triggering an alert condition if the detected pressure or flow rate of the gas in the at least one gas passage is within a predetermined range.

16. A method for manufacturing a riveted joint by inserting a rivet into material, the method comprising:
providing a die assembly comprising:
a multi-part die having a main body and an insert, the main body having a ring portion which together with the insert defines a die cavity in which material is to be deformed, wherein the main body includes a stem which extends from an opposite side of the die from the die cavity;
a die holder which receives the stem and supports the die such that the die is operational with the die cavity being exposed for receipt of material; and
at least one gas passage defined within the stem of the die, the at least one gas passage being sealed substantially closed by the insert, the at least one gas passage extending into the die holder;
the method further comprising:

supplying pressurised gas from a source to an inlet of a conduit having an outlet in fluid communication with the at least one gas passage;

driving the rivet into the material and towards the die such that a shank of the rivet pierces the top sheet and then flares outwardly in the die such that the material forms an annulus in the die cavity that encapsulates the shank; and detecting the pressure or flow rate of the gas in the at least one gas passage using a sensor.

17. A method according to claim 16, wherein the pressure or flow rate of the gas in the at least one gas passage is detected whilst the rivet is being driven into the material.

18. A method according to claim 17, wherein the pressure or flow rate of the gas in the at least one gas passage is detected at a point during the driving of the rivet which is during or after the time in which the shank of said rivet is flaring outwardly in the die.

19. A method according to claim 16, further comprising triggering an alert condition if the detected pressure or flow rate of the gas in the at least one gas passage is within a predetermined range.

20. A die assembly comprising:
a multi-part die having a main body and an insert, the main body having a ring portion which together with the insert defines a die cavity in which material is to be deformed, wherein the main body includes a stem which extends from an opposite side of the die from the die cavity;
a die holder which receives the stem and supports the die such that the die is operational with the die cavity being exposed for receipt of material;
at least one gas passage defined within the stem of the die, the at least one gas passage being sealed substantially closed by the insert, the at least one gas passage extending into the die holder;
a conduit having an outlet in fluid communication with the at least one gas passage and an inlet connectable to a source of pressurised gas; and
a sensor for detecting the pressure or flow rate of the gas in the at least one gas passage.

21. A die assembly according to claim 20, wherein the ring portion is configured to provide reinforcement against radial expansion of the die.

22. A die assembly according to claim 20, wherein the ring portion and the insert exhibit an interference fit.

23. A die assembly according to claim 20, wherein at least part of the insert is harder than at least part of the ring.

24. A die assembly according to claim 23, wherein said part of the insert includes at least a portion of a central pip.

* * * * *